(12) United States Patent
Clernon

(10) Patent No.: US 9,917,903 B2
(45) Date of Patent: Mar. 13, 2018

(54) INTERNET OF THINGS PROVISIONING

(71) Applicant: Verizon Patent and Licensing Inc., Arlington, VA (US)

(72) Inventor: George F. Clernon, Stoneham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 150 days.

(21) Appl. No.: 14/980,181

(22) Filed: Dec. 28, 2015

(65) Prior Publication Data

US 2017/0187807 A1 Jun. 29, 2017

(51) Int. Cl.
*H04B 17/00* (2015.01)
*H04L 29/08* (2006.01)
*H04L 12/24* (2006.01)
*H04W 4/00* (2018.01)

(52) U.S. Cl.
CPC .......... *H04L 67/125* (2013.01); *H04L 41/082* (2013.01); *H04L 41/0806* (2013.01); *H04L 41/0859* (2013.01); *H04L 67/34* (2013.01); *H04W 4/001* (2013.01); *H04W 4/005* (2013.01)

(58) Field of Classification Search
CPC ............................. H04W 52/0261; H04W 4/02
USPC .................................. 370/311–339; 455/456
See application file for complete search history.

(56) References Cited

U.S. PATENT DOCUMENTS

2013/0088983 A1* 4/2013 Pragada ................ H04W 16/14
370/252

* cited by examiner

*Primary Examiner* — Iqbal Zaidi

(57) ABSTRACT

A method, a device, and a non-transitory storage medium provides an installation of an IoT device in which the installation includes to store Internet of Things (IoT) management information, which includes IoT device information of the IoT device; upload the IoT management information to a network device in response to the storing of the IoT management information; store the IoT management information at the IoT device in response to the upload; present a map of the location; receive a designation of a location point on the map that indicates where the IoT device is to be installed; determine whether the IoT device is to be updated; update the IoT device in response to a determination that an update for the IoT device is available; calibrate one or more sensors of the IoT device; and configure the IoT device to transmit IoT data to another network device.

20 Claims, 13 Drawing Sheets

INTERNET OF THINGS PROVISIONING

BACKGROUND

Internet of Things (IoT) technology refers to a wide range of devices that can collect data. The IoT devices may be configured to transfer the data via a network. Since IoT technology has nearly limitless applications that can be leveraged to form new and useful services, interest among service providers and developers in IoT technology continues to increase. Depending on the IoT device, IoT provisioning of the IoT device can present certain challenges and may result in unnecessary man hours being spent before the IoT device can provide the data for use.

DETAILED DESCRIPTION OF PREFERRED EMBODIMENTS

Figure 1:
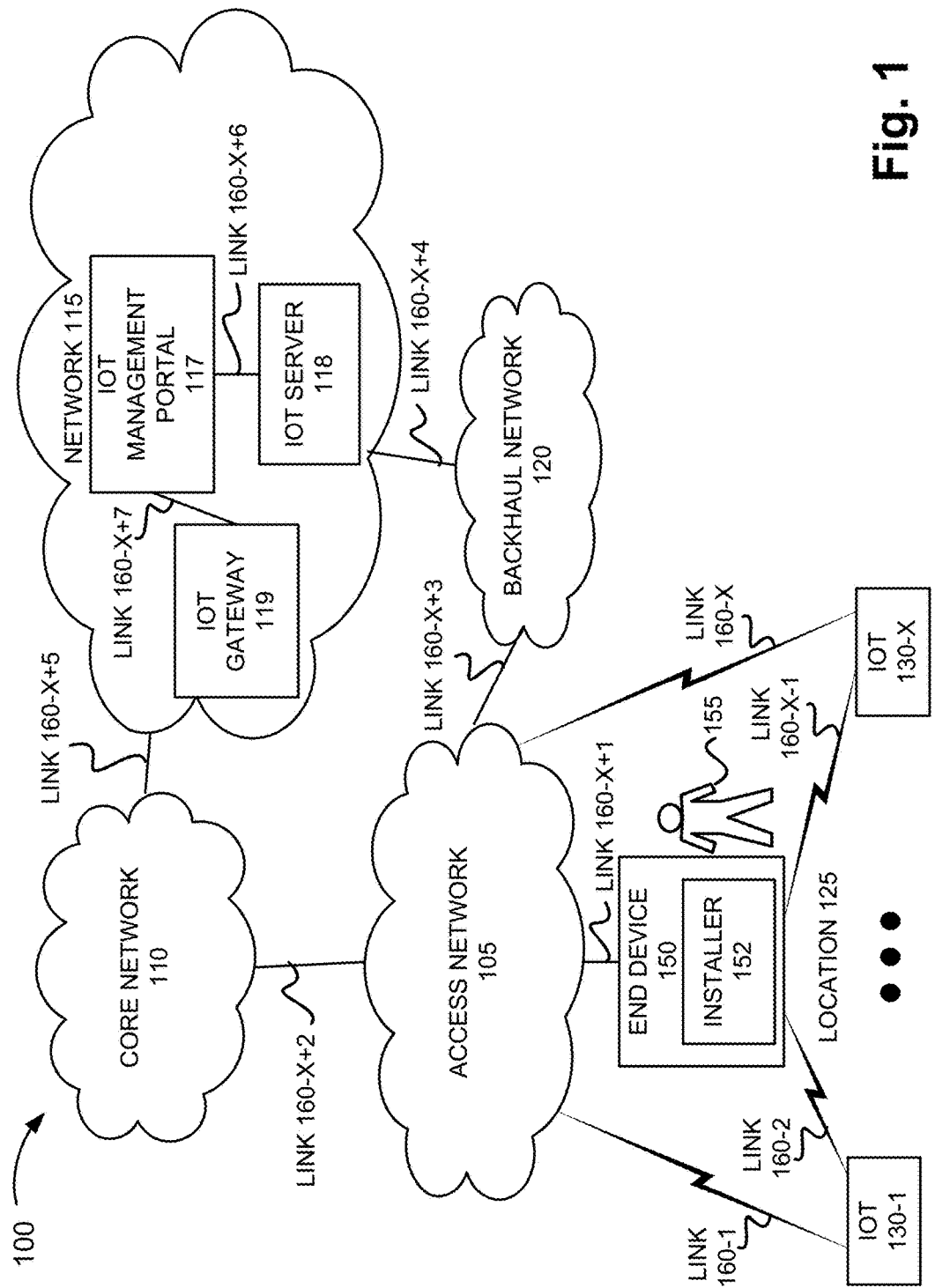
FIG. 1 is a diagram illustrating an exemplary environment in which an exemplary embodiment of IoT services of an IoT installation platform may be implemented.

The following detailed description refers to the accompanying drawings. The same reference numbers in different drawings may identify the same or similar elements. Also, the following detailed description does not limit the invention.

IoT may be described as a network of physical objects or "things" embedded with various types of electronics, software, sensors, logic, circuitry, etc., that can collect and exchange data. A "thing" (referred to herein as an IoT device) may connect to a service hosted on the Internet indirectly (e.g., via another network device (e.g., a coordinator, a gateway, etc.)) or directly. An installer (e.g., a technician) may assume when performing the installation of the IoT device that some data is set at the original equipment manufacturer (OEM) factory or through some user interaction during installation. In many cases, such installation interaction requires another device (e.g., an end device operated by the installer) to interrogate the IoT device. In all cases, the IoT device must be powered on and configured to interact with the other device. Additionally, during an installation process of the IoT device, the location of the IoT device may be desired. In some cases, the IoT device may be installed indoors where it may not be possible to rely on certain location technologies (e.g., a Global Positioning System (GPS), etc.). Additionally, or alternatively, the IoT device may not include location-aware functionality. Further, other factors pertaining to the location where the IoT device is to be installed may be involved, such as identifying not only x and y coordinates, but also a z coordinate (e.g., latitude, longitude, and altitude).

During the installation process, the installer will want to connect the IoT device to a network. Depending on the configuration of the network (e.g., authorization rules, policies, etc.), the IoT device may join the network but may not be allowed to transmit data beyond a certain node (e.g., a gateway, a coordinator, etc.). The installer may need to provide certain information (e.g., unique identifier, location, etc.) to a device management system so that the IoT device is permitted to connect to (e.g., join) the network and transmit data on the network to a server, a cloud, etc., which may use the IoT data and/or provide an end user service based on the IoT data.

Further, during the installation of the IoT device, the IoT device may need to be updated. For example, the IoT device may have been packaged or sitting on a shelf for a period of time prior to its installation. According to such circumstances, the logic (e.g., firmware, software, etc.) of the IoT device may need to be updated. This may require the installer to initiate an update process. Additionally, or alternatively, the installer may need to reconfigure hardware. For example, the installer may need to alter a configuration (e.g., a jumper setting on a sensor board, etc.) of the IoT device. The exemplary installation interactions performed by the installer can be time-consuming, particularly when the installer may need to install a number of IoT devices.

According to an exemplary embodiment, an IoT installation platform provides for the provisioning and connecting of an IoT device to a network. According to an exemplary embodiment, when an IoT device does not include near field communication (NFC) logic (e.g., an integrated circuit (IC), a chip, etc.), near field communication logic is integrated with the IoT device. According to an exemplary implementation, the near field communication logic includes on-board memory to which IoT management information can be written. For example, the IoT management information may include a user-assigned unique identifier of the IoT device and IoT device information (e.g., a make and a model of the IoT device, a firmware or a software version, an equipment identifier (e.g., an International Mobile Equipment Identifier (IMEI), etc.), a Media Access Control (MAC) address, security credentials, the number and type of sensors included with the IoT device, and the like). The near field communication logic may operate in active and/or passive modes. According to various embodiments, the near field communication logic may be used to communicate with an end device operated by a user (e.g., an installer) during which various tasks may be performed pertaining to the installation of the IoT device at a given location.

According to other embodiments, when the IoT device does not include short-range communication logic, another type of short-range communication logic is integrated with the IoT device. For example, the short-range communication logic may be implemented as Bluetooth (e.g., Bluetooth Low Energy (BLE), Bluetooth Classic, etc.), Wi-Fi, optical wireless (e.g., Infrared (IR) (e.g., legacy, second generation Infrared), etc.), radio frequency identification (RFID) technology, ZigBee, ZWave, ultra wideband (UWB), low frequency radio frequency (RF), another type of known or future generation communication technology, and/or a wired communication technology. The IoT management information may be stored in available memory included in the IoT device.

According to an exemplary embodiment, an end device includes software of the IoT installation platform that guides the user to install the IoT device at a given location. According to an exemplary implementation, the software provides a customized workflow based on the attributes, capabilities, etc., of the IoT device to be installed. According to an exemplary embodiment, the software allows the user to interrogate various devices, such as the IoT device, the end device, and/or other network devices for information pertaining to the installation of the IoT device. According to an exemplary embodiment, the software includes a map, which can be continuously updated, to show the locations of the IoT devices to be installed at a given locale and the locations of the IoT devices currently installed. The software also allows the user to communicate with an IoT management portal and an IoT server. The software allows the user to store IoT management information of the IoT device at the IoT management portal. Additionally, the software allows the user to confirm that the IoT device is properly calibrated and communicating with the IoT server.

According to an exemplary embodiment, the IoT installation platform includes the IoT management portal. The IoT management portal provides various IoT services including storing IoT management information pertaining to IoT devices, storing downloadable software for end devices, updating IoT devices, generating maps, facilitating the calibration of IoT devices, and connecting IoT devices to a network.

According to an exemplary embodiment, the IoT installation platform includes the IoT server. The IoT server stores and uses IoT data stemming from IoT devices that are connected to the network. The IoT server provides an end user service based on the IoT data received from the IoT devices.

According to an exemplary embodiment, the IoT installation platform includes an IoT gateway. The IoT gateway provides an authorization service pertaining to IoT devices connecting to the network and accessing various network elements (e.g., IoT server, etc.).

FIG. 1 is a diagram illustrating an exemplary environment 100 in which an exemplary embodiment of an IoT installation platform may be implemented. As illustrated, environment 100 includes an access network 105, a core network 110, a network 115, and a backhaul network 120. Network 115 includes network elements. The network elements in network 115 include an IoT management portal 117, an IoT server 118, and an IoT gateway 119. Environment 100 also includes a location 125. Location 125 includes network elements. The network elements at location 125 include IoT devices 130-1 through 130-X (also referred to as collectively as IoT devices 130 and, individually and generically as IoT device 130). Environment 100 further includes an end device 150 and a user 155. End device 150 includes an installer 152.

As further illustrated, environment 100 includes communicative links 160-1 through 160-X+7 (also referred to collectively as links 160 and, generically and individually as link 160) between the network elements, networks, and end device 150. A network element may transmit and receive data via link 160. Similarly, end device 150 may transmit and receive data via link 160. Environment 100 may be implemented to include wireless (e.g., radio, etc.) and/or wired (e.g., electrical, optical, etc.) links 160. A communicative connection between network elements and between end device 150 and a network element may be direct or indirect via link 160. For example, an indirect communicative connection may involve an intermediary network device or network element, and/or an intermediary network not illustrated in FIG. 1. Additionally, the number, the type (e.g., wired, wireless, etc.), and the arrangement of links 160 illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of end devices, the number of networks, and the arrangement in environment 100 are exemplary. According to other embodiments, environment 100 may include additional network elements, fewer network elements, and/or differently arranged network elements, than those illustrated in FIG. 1. Additionally, or alternatively, in some instances, there may be only a single IoT device 130 at location 125. Additionally, or alternatively, for example, there may be multiple end devices 150, IoT management portals 117, IoT servers 118, IoT gateways 119, and so forth.

Additionally, or alternatively, according to other embodiments, multiple network elements may be implemented on a single device, and conversely, a network element may be implemented on multiple devices. For example, IoT management portal 117 and IoT gateway 119 may be implemented on a single network device. Additionally, or alternatively, environment 100 may include an additional network and/or arrangement of networks that is/are different from that illustrated in FIG. 1. For example, access network 105 may be connected to another network (not illustrated). The other network may include other network elements (not illustrated). Additionally, or alternatively, one network may be combined with another network. For example, core network 110 and network 115 may be combined into a single network.

Access network 105 includes one or multiple networks of one or multiple types. For example, access network 105 may be implemented to include a terrestrial network, a satellite network, a wireless network, and/or a wired network. According to an exemplary implementation, access network 105 includes a radio access network (RAN). The RAN may be a 3rd Generation (3G) RAN, a 3.5G RAN, a Fourth Generation (4G) RAN, a 4.5G RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network, a U-TRAN, Universal Mobile Telecommunications System (UMTS) RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, a LoRa Wide Area Network (WAN), or the like. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. Access network 105 may include a wired network. For example, access network 105 may include an optical network or a cable network.

Core network 110 includes one or multiple networks of one or multiple types. For example, core network 110 may be implemented to include a terrestrial network, a satellite network, a wireless network, and/or a wired network. According to an exemplary implementation, core network 110 includes a complimentary network pertaining to the one or multiple RANs described above. For example, core network 110 may include the core part of an LTE network, an LTE-A network, etc. Depending on the implementation, core network 110 may include various network elements, such as a gateway, a support node, a serving node, a router, a switch, a bridge, as well other network elements pertaining to various network-related functions, such as billing, security, authentication and authorization, network polices, subscriber profiles, etc.

Network 115 includes one or multiple networks of one or multiple types. For example, network 115 may include the Internet, the World Wide Web, an Internet Protocol (IP) Multimedia Subsystem (IMS) network, a cloud network, a wide area network (WAN), a metropolitan area network (MAN), a service provider network, a private IP network, some other type of backend network, and so forth. As illustrated, according to an exemplary embodiment, network 115 includes IoT management portal 117, IoT server 118, and IoT gateway 119. According to other exemplary embodiments, IoT management portal 117, IoT server 118, and/or IoT gateway 119 may be implemented elsewhere in environment 100 (e.g., in core network 110, a local area network (LAN) at location 125, and so forth).

Referring to FIG. 1, IoT management portal 117 includes logic that provides an IoT management service. For example, IoT management portal 117 may be implemented as a network computer or some other type of computational and communicative device. IoT management portal 117 may include a mass storage device. For example, the mass storage device may store IoT management information in a database pertaining to IoT devices 130. Examples of IoT management information are described further below. Additionally, the mass storage device may store downloadable software (e.g., installer 152) for end device 150. For example, IoT management portal 117 may include an application store in which user 155 may select from various installers 152 the correct installer 152 to be used to install a particular IoT device 130. Once installed at end device 150, installer 152 provides to user 155 various services that facilitate the installation of IoT device 130.

According to an exemplary embodiment, the IoT management service allows user 155 to upload, via installer 152, IoT management information to IoT management portal 117. For example, the IoT management information may include a user-assigned unique identifier of IoT device 130 and location information (e.g., latitude and longitude; latitude, longitude, and altitude; etc.) that indicates where IoT device 130 is to be installed. The IoT management information may also include IoT device information (e.g., make and model, software/firmware version, a device identifier, a network address, security credentials, the number and type of sensors included in IoT device 130, and the like).

According to an exemplary embodiment, the IoT management service allows user 155 to download, via installer 152, an update from IoT management portal 117. According to an exemplary implementation, the IoT management service may obtain update information pertaining to various IoT devices of various OEMs. Based on the update information and IoT management information, IoT management portal 117 may determine whether IoT device 130 needs to be updated. When IoT management portal 117 determines that IoT device 130 needs to be updated, user 155 may download the update to end device 150 either from IoT management portal 117 or a third party network device. Additionally, or alternatively, user 155 may obtain any additional information regarding the update process (e.g., hardware configurations, etc.). Subsequent to a successful download of the update, user 155 may establish a connection with IoT device 130 via installer 152 and update IoT device 130.

According to an exemplary embodiment, the IoT management service facilitates IoT device 130 connecting to the network. According to an exemplary implementation, the IoT management service manages queries from IoT gateway 119 pertaining to the authentication, authorization, and on-boarding (e.g., joining) of IoT device 130 to the network.

IoT server 118 includes logic that performs a process or a function, provides a service, or the like, based on IoT data. For example, IoT server 118 may be implemented as a network computer or some other type of computational and communicative device. IoT server 118 may include a mass storage device. For example, the mass storage device may store IoT data. IoT server 118 may provide an end user service to customers or users based on the IoT data received from IoT devices 130 and stored. By way of further example, users may connect to IoT server 118 via an end user device to receive traffic information, weather information, a location-based service, or some other IoT-based service.

IoT gateway 119 includes logic that provides an authentication and authorization service. According to an exemplary embodiment, IoT gateway 119 authenticates and authorizes IoT device 130 to connect to the network (e.g., network 115) and communicate with IoT management portal 117 (e.g., transmit test IoT data) and IoT server 118 (e.g., transmit IoT data). According to an exemplary implementation, IoT gateway 119 authenticates and authorizes IoT device 130 based on communication with IoT management portal 117. For example, IoT gateway queries an IoT database (e.g., security credentials, etc.) stored in IoT management portal 117, as described herein.

Backhaul network 120 includes one or multiple networks of one or multiple types. According to an exemplary implementation, backhaul network 120 includes a backbone network. For example, the backbone network may be implemented as an optical transport network or other suitable architecture. According to an exemplary implementation, backhaul network 120 provides a connection path to the IoT server 118 of network 115. For example, IoT device 130 may transmit IoT data to IoT server 118 via access network 105 and/or backhaul network 120. According to an exemplary implementation, when access network 105 is implemented as an LTE RAN or an LTE-A RAN, backhaul network 120 may directly connect to an evolved Node B. According to such architecture, the IoT data transmitted may not traverse network elements of a complimentary part of core network 110. According to other exemplary implementations, IoT device 130 may transmit IoT data to IoT server 118 via access network 105 and core network 110.

Location 125 is a geographic locale. Location 125 may be an indoor location, an outdoor location, a public location, a private location, a place of business, and so forth. For example, location 125 may be a retail location (e.g., a shopping mall, a retail store, a grocery store, etc.), a transportation location (e.g., a train station, an airport, a bus station, etc.), an entertainment location (e.g., a movie theater, a museum, a park, a restaurant, a sports stadium, etc.), a business location (e.g., a bank, a hotel, etc.), a parking garage, a hospital, a traffic intersection, a residence, a facility (e.g., a manufacturing facility, a storage facility, etc.), and so forth. IoT device 130 may be installed or situated at location 125.

IoT device 130 includes logic that collects, obtains, and/or generates IoT data. For example, IoT device 130 may be implemented to include various technologies, such as a sensor, a tag, a camera, an antenna, etc, that collects, obtains, and/or generates IoT data. According to various implementations, IoT device 130 may be a stationary device or a mobile device. IoT device 130 may include a component (e.g., a Global Positioning System (GPS) chipset, etc.) that provides location-aware functionality. IoT device 130 may be powered by an internal source, an external source, a battery, an outlet, electromagnetic waves, and so forth.

There are numerous types of IoT devices 130 available today and an exhaustive treatment of the various types of IoT devices 130 is beyond the scope of this disclosure. Nevertheless, examples of IoT devices 130 include a meter (e.g., a utility meter, a parking meter, etc.), a sensor (e.g., a weather sensor, a traffic sensor, a home appliance sensor, an indoor environment sensor, etc.), a video camera (e.g., a security video camera, a video camera to capture social information at an establishment (e.g., number of persons in a bar, restaurant, etc.) etc.), a LoJack® device, a tag (e.g., to collect location data pertaining to public transportation vehicles (e.g., busses, subways, trains, public service vehicle, etc.), a dongle, a smartphone (e.g., to collect location data pertaining to a mobile device and/or its user), a medical device, etc.

IoT device 130 communicates to access network 105, network 115 and, core network 110 and/or backhaul network 120 via a communication interface. IoT device 130 may also communicate with local devices (e.g., end device 150, etc.) at location 125 using various short-range communication technologies. IoT devices 130 may form a local area network at location 125. Additionally, IoT devices 130 may communicate to access network 105 via a network device located at location 125. For example, although not illustrated, according to other exemplary implementations, location 125 may include IoT gateway 119.

End device 150 includes a communicative and computational device. End device 150 may be implemented as a mobile device or a portable device. For example, end device 150 may be implemented as a smartphone, a tablet, a phablet, a netbook, a computer (e.g., a laptop, a palmtop, etc.), a personal digital assistant, and so forth. According to an exemplary embodiment, end device 150 provides access to and communication with IoT management portal 117 and IoT server 118.

According to an exemplary embodiment, end device 150 includes installer 152. According to an exemplary embodiment, installer 152 includes logic that guides user 155 through an installation process pertaining to IoT device 130. The installation process includes performing various tasks. According to an exemplary implementation, installer 152 allows user 155 to perform various tasks including communicating with IoT device 130, IoT management portal 117, and IoT server 118; reading and writing IoT management information to a memory of IoT device 130; uploading IoT management information to IoT management portal 117; setting and/or obtaining location information of IoT device 130; updating IoT device 130; mapping the installation of IoT device 130; calibrating IoT device 130; and managing installation errors. Depending on the circumstances, user 155 may elect to perform some or all of the tasks available.

User 155 is an operator of end device 150. For example, user 155 may be a network administrator, a technician, a third party (e.g., a vendor, a merchant), and so forth. User 155 may use the IoT services provided by the IoT installation platform, as described herein.

Figure 2A:
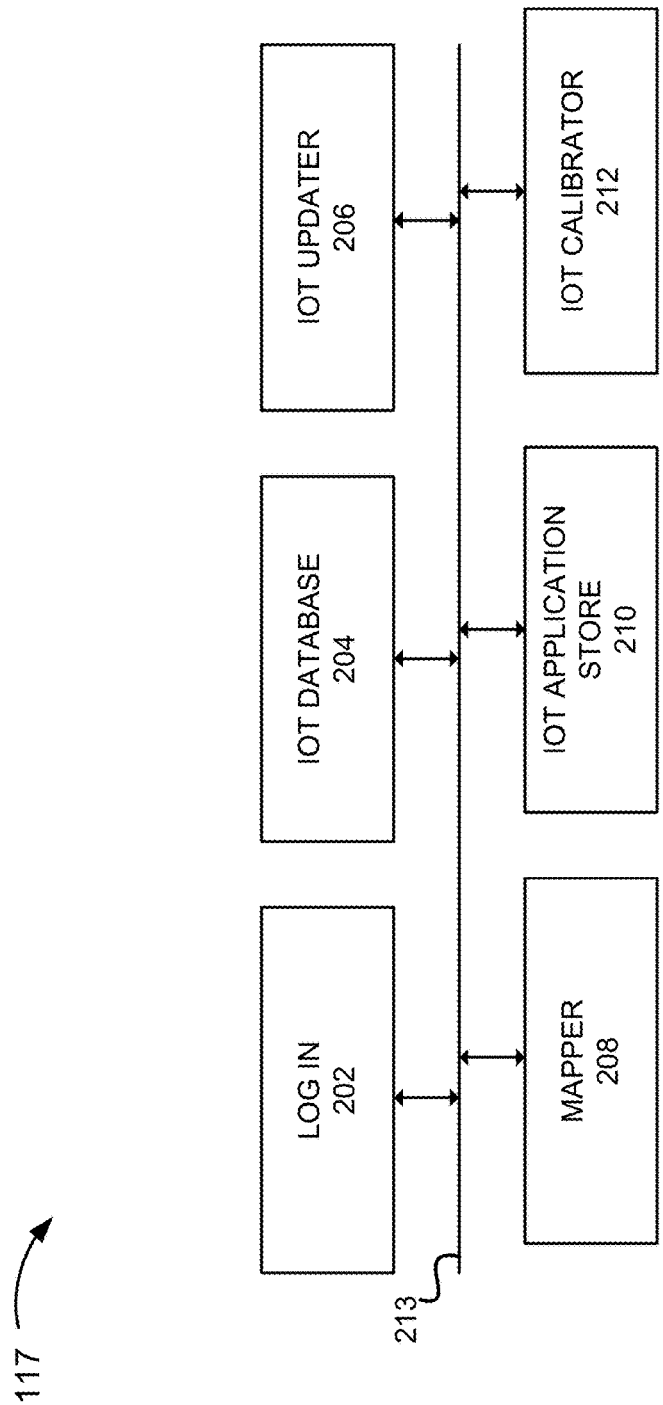
FIG. 2A is a diagram illustrating exemplary network elements of an IoT management portal depicted in the environment of FIG. 1.

FIG. 2A is a diagram of exemplary network elements of IoT management portal 117 that provide various functions and/or services, as described herein. As illustrated, IoT management portal 117 includes a log in 202, an IoT database 204, an IoT updater 206, a mapper 208, an IoT application store 210, and an IoT calibrator. According to other exemplary embodiments, IoT management portal 117 may include additional, fewer, and/or different network elements than those illustrated in FIG. 2A and described herein. Additionally, or alternatively, multiple network elements of IoT management portal 117 may be combined into a single network element and/or a single network element may be implemented as multiple network elements in which a process or a function may be collaboratively performed or multiple processes or functions may be split between them.

Log in 202, IoT database 204, IoT updater 206, mapper 208, IoT application store 210, and/or IoT calibrator 212 may be connected to and communicate with each other via a link 213. For example, link 213 may be implemented as a hardware link (e.g., a data bus, a system bus, a control bus), a software link (e.g., an application program interface (API), inter-process communication (IPC), etc.) or an inter-network device link (e.g., link 160).

According to an exemplary embodiment, log in 202 includes logic that provides a log in service. For example, log in 202 performs authentication and authorization. As an example, user 155 may enter a user name and a password, which is subsequently validated or not. Log in 202 may include an on-boarding process (e.g., registration, etc.) for a new user 155 that includes configuration and assignment of user credentials. For example, new user 155 may communicate with IoT management platform 117 via a web browser or some other type of client. Additionally, subsequent to downloading installer 152, user 155 may communicate with IoT management platform 117 via installer 152. Log in 202 stores these user credentials and uses the user credentials for comparison when user 155 logs in (e.g., via a web browser, installer 152, another type of client, etc.). Log in 202 may also provide other well-known communication services pertaining to security, such as encryption, secure connection, and so forth. According to an exemplary embodiment, log in 202 also includes logic that manages and stores a subscriber profile. The subscriber profile may store data pertaining to user 155 and the various IoT services to which user 155 subscribed with respect to the IoT installation platform.

Figure 2B:
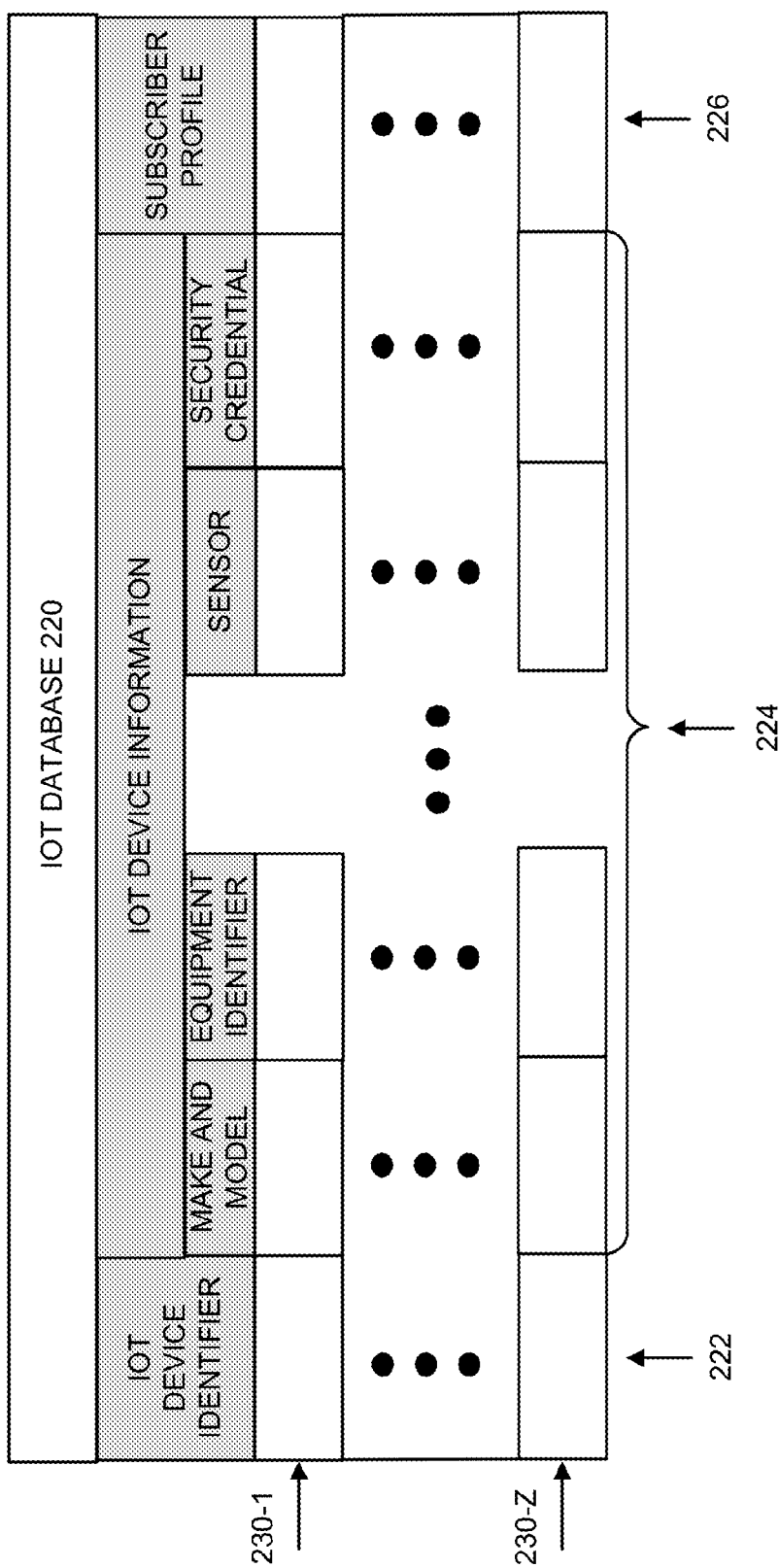
FIG. 2B is a diagram illustrating an exemplary database that stores exemplary IoT management information.

According to an exemplary embodiment, IoT database 204 includes logic that provides a data service. For example, IoT database 204 includes logic that stores and manages a database including IoT management information. For example, IoT database 204 includes logic of a database management system (DBMS). The DBMS may be implemented using conventional, well-known, or commercially available software/packages (e.g., Microsoft SQL, Oracle Database, etc.). IoT database 204 also stores the IoT management information in a database. By way of example, referring to FIG. 2B, IoT database 204 includes an exemplary IoT database 220 in the form of a table. As illustrated, database 220 includes an IoT device identifier field 222, an IoT device information field 224, and a subscriber profile field 226.

According to other implementations, database 220 may include additional instances of data, fewer instances of data, and/or different types of data. For example, according to other exemplary implementations, database 220 may include a state of installation field that indicates whether the installation of IoT device 130 has not been started, partially completed, fully completed, etc. Database 220 include profiles 230-1 through 230-Z (also referred to as profiles 230 and, individually and generically as profile 230). Each profile 230 pertains to a different IoT device 130.

IoT device identifier field 222 stores a user-assigned IoT device identifier. For example, user 155 may assign a name or other form of a string to IoT device 130. The user-assigned IoT device identifier may be different than an equipment identifier, as described herein.

IoT device information field 224 stores various instances of data pertaining to IoT device 130. For example, IoT device information field 224 may store data that indicates the make and model of IoT device 130, an equipment identifier (e.g., an IMEI, a bar code, a serial number, a Federal Communications Commission (FCC) identifier, etc.), a firmware or software version installed on IoT device 130, a MAC address, security credentials, location information of IoT device 130, the number and type of sensors included with IoT device, whether a sensor has been calibrated, etc.

Subscriber profile field 226 stores a subscriber profile pertaining to user 155. For example, IoT installation platform may offer varying levels of IoT services, as described herein. The subscriber profile may also include data indicating log in information for user 155 as well as other information that may be obtained from user 155 when user 155 subscribes to the IoT installation platform.

As previously described, user 155 may upload IoT management information via installer 152 to IoT management platform 117 (e.g., IoT database 204). Additionally, the IoT management information may be accessed and used to perform various tasks during the installation process, as described herein. For example, IoT gateway 119 may query IoT database 204 to authenticate and authorize IoT device, IoT updater 206 may access and use IoT management information to update IoT device 130, etc.

According to an exemplary embodiment, IoT updater 206 includes logic that provides an IoT updating service. For example, IoT updater 206 manages the updating of IoT device 130. According to an exemplary implementation, IoT updater 206 stores software/firmware updates pertaining to various IoT devices 130. For example, IoT updater 206 obtains the software/firmware updates from third party devices. For example, the service provider of the IoT installation platform may have business relationships with various IoT developers, manufacturers, etc. The IoT developers/manufactures may host various web sites or Internet sites from which updates for IoT devices are made available (e.g., downloadable) to the public and/or service providers. IoT updater 206 may manage data connections to these sites, notifications and communications to and from the sites pertaining to whether updates are available, and obtain any updates for IoT devices as these updates occur. Thereafter, IoT updater 206 makes available the updates to users (e.g., user 155) of the IoT services of the IoT installation platform. Additionally, or alternatively, IoT updater 206 stores uniform resource identifiers (URIs) of the sites from which updates may be obtained by the users directly from the IoT developers, manufacturers, etc.

As a part of the IoT update service, IoT updater 206 may query IoT database 204 to determine the version currently installed at IoT device 130. IoT updater 206 may store a database that maps or correlates make/model numbers (and/or other IoT device identifying information) of various IoT devices to update information (e.g., which includes version information) provided by the OEMs, etc. IoT updater 206 compares the currently installed version information to the version information provided by the OEMs. Based on a result of the comparison, IoT updater 206 determines whether IoT device 130 should be updated. The update information may also include the URIs and other files pertaining to other configuration settings, hardware settings, instructions, etc., that user 155 may need to know or perform in order to ensure IoT device 130 is updated correctly. As previously mentioned, user 155 may communicate with IoT updater 206 via installer 152 of end device 150.

According to an exemplary embodiment, mapper 208 includes logic that provides a map service. For example, mapper 208 includes logic that generates a map file that can be displayed by installer 152. According to an exemplary implementation, when user 155 intends to install IoT device 130 in an indoor location (e.g., a building, a store, a facility, etc.), user 155 may upload a map file representative of the indoor location to mapper 208. Mapper 208 may accept conventional or well-known file formats developed in computer-aided design (CAD) software (e.g., 2-D, 3-D, etc.), and convert the map file to a file format used by installer 152. Mapper 208 may also store the map file and/or the converted map file in IoT database 204 so that such file(s) are available to other users affiliated with the installation of IoT devices 130 at a given location. As described further below, installer 152 includes logic that provides various functions pertaining to the maps, such a maps editor to indicate points of interest (e.g., locations at which IoT device 130 is to be installed), as well as other map-related functionalities, such as indoor/outdoor positioning, indoor/outdoor navigation and routing, and position calibration. Mapper 208 also includes logic that provides a geographic information service (GIS). For example, when user 155 intends to install IoT device 130 at an outdoor location, user 155 may select a map via mapper 208 and be presented with a map of the outdoor location. Mapper 208 may use a third party service to provide the GIS. Mapper 208 may also indicate a position of user 155 on the map.

According to an exemplary embodiment, IoT application store 210 includes logic that provides a store service. For example, IoT application store 210 includes logic that stores various installers 152 pertaining to various IoT devices 130, as well as manages the selection and downloading of installers 152 to end devices 150. According to an exemplary implementation, IoT application store 210 provides a graphical user interface via which user 155 may provide information, select, and download installer 152, which can be used to guide user 155 during an installation process of a particular IoT device 130. According to an exemplary implementation, user 155 may provide certain information, via the graphical user interface, such as the type of IoT device 130 to be installed (e.g., make and model, sensor versus camera, etc.), the capabilities of IoT device 130 (e.g., communication capabilities, protocols configured, encryption used, number and type of sensors included in IoT device 130, etc.), and so forth. User 155 may also provide certain details pertaining to end device 150 (e.g., operating system, make and model, etc.).

Based on the combination of this information provided by user 155, IoT application store 210 may identify the appropriate installer 152. For example, IoT application store 210 may identify the appropriate workflows and/or sub-components of installer 152 (e.g., an information manager, an updater, a calibrator, etc., as described further below) that can be used to successfully install IoT devices 130. Thereafter, user 155 may download and install installer 152 on end device 150. Once installed on end device 150, user 155 may be guided through an installation process for installing IoT device 130 at a given location 125. As described further below, the installation process may include a specific workflow based on the attributes and capabilities of IoT device 130.

IoT calibrator 212 includes logic that provides an IoT calibration service. For example, IoT calibrator 212 includes logic that stores and provides user 155 access to IoT data obtained from IoT device 130. Depending on the type of IoT device 130, IoT device 130 may include one or multiple sensors that need to be calibrated. IoT calibrator 212 may receive test IoT data from IoT device 130 during a calibration process performed between user 155 via end device 150 and IoT device 130. For example, installer 152 guides user 155 through a customized workflow in view of IoT device 130 including a particular sensor. User 155 may configure a network address, which corresponds to IoT management platform (e.g., IoT calibrator 212), to which IoT device 130 transmits the test IoT data. During the calibration process, user 155 may verify that the test IoT data is received at IoT management platform 117 and that the test IoT data is correct. For example, assume that sensor is a weight sensor and the calibration process, which includes user 155 placing a series of test weights on the weight sensor, is performed by user 155 under the guidance of installer 152. After user 155 places one or multiple test weights to be weighed by the weight sensor, IoT device 130 transmits the weight(s) (e.g., as test IoT data) to IoT management platform 117. IoT management platform 117 stores the test IoT data User 155 subsequently accesses IoT management platform 117 and is able to confirm receipt of the test IoT data and its value(s). When the test IoT data accurately reflects the test weight(s), user 155 may either continue on with the calibration process (e.g., if additional weights need to be tested) or deem that the IoT device 130 is calibrated. When the test IoT data does not accurately reflect the test weight(s), user 155 may perform various tasks, such as open a trouble ticket, troubleshoot, etc., as described further below. Installer 152 may assist user 155 to perform certain tasks, as described further below. According to an exemplary implementation, IoT calibrator 212 may generate and store IoT management information (e.g., in an IoT calibration field) in IoT database 204 that indicates that IoT device 130 has or has not been calibrated.

Figure 2C:
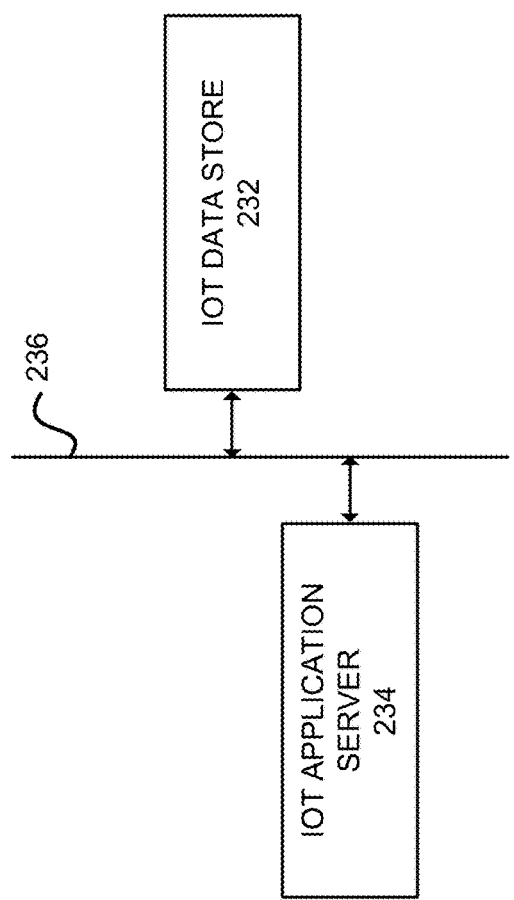
FIG. 2C is a diagram illustrating exemplary network elements of an IoT server depicted in the environment of FIG. 1.

FIG. 2C is a diagram illustrating exemplary network elements of IoT server 118 that provide various functions and/or services, as described herein. For example, as illustrated, IoT server 118 includes an IoT data store 232 and an IoT application server 234. According to other exemplary embodiments, IoT server 118 may include additional, fewer, and/or different network elements than those illustrated in FIG. 2C and described herein. Additionally, or alternatively, multiple network elements of IoT server 118 may be combined into a single network element and/or a single network element may be implemented as multiple network elements in which a process or a function may be collaboratively performed or multiple processes or functions may be split between them.

IoT data store 232 and IoT application server 234 may be connected to and communicate with each other via a link 236. For example, link 236 may be implemented as a hardware link (e.g., a data bus, a system bus, a control bus), a software link (e.g., an application program interface (API), inter-process communication (IPC), etc.) or an inter-network device link (e.g., link 160).

According to an exemplary embodiment, IoT data store 232 includes logic that provides a data service. For example, IoT data store 232 includes logic that manages and stores IoT data obtained from IoT devices 130 and provides access to the IoT data. For example, IoT application server 234 and other devices (e.g., end device 150) may have access to the IoT data.

According to an exemplary embodiment, IoT application server 234 includes logic that provides an end user service. For example, IoT application server 234 includes logic that provides a web service based on the IoT data obtained from IoT devices 130 and stored in IoT data store 232. As previously mentioned, IoT technology has nearly limitless applications that can be leveraged to form new and useful services. By way of example, IoT application server 234 may provide services pertaining to real-time traffic, weather, medical-related tracking, a location-based service, and so forth.

Figure 2D:
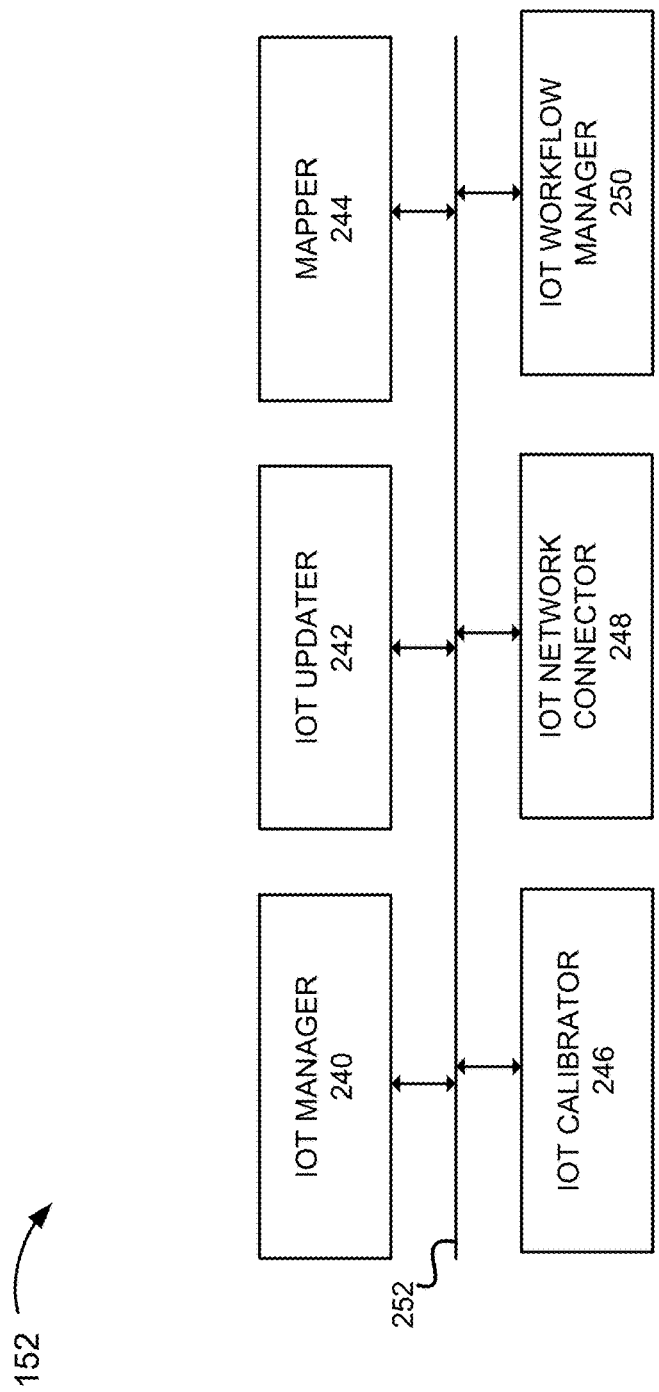
FIG. 2D is a diagram of exemplary elements of an installer depicted in the environment of FIG. 1.

FIG. 2D is a diagram illustrating exemplary elements of installer 152 that provide various functions and/or services, as described herein. For example, as illustrated, installer 152 includes an IoT manager 240, an IoT updater 242, a mapper 244, an IoT calibrator 246, an IoT network connector 248, and an IoT workflow manager 250. According to other exemplary embodiments, installer 152 may include additional, fewer, and/or different elements from those illustrated in FIG. 2D and described herein. Additionally, or alternatively, multiple elements of installer 152 may be combined into a single element and/or a single element may be implemented as multiple elements in which a process or a function may be collaboratively performed or multiple processes or functions may be split between them. According to an exemplary embodiment, each of the elements of installer 152 provides a graphical user interface via which user 155 may perform various tasks.

IoT manager 240, IoT updater 242, mapper 244, IoT calibrator 246, IoT network connector 248, and IoT workflow manager 250 may be connected to and communicate with each other via a link 252. For example, link 252 may be implemented as a hardware link (e.g., a data bus, a system bus, a control bus), a software link (e.g., an application program interface (API), inter-process communication (IPC), etc.) or an inter-network device link (e.g., link 160). According to an exemplary implementation, the communication between IoT manager 240, IoT updater 242, mapper 244, IoT calibrator 246, IoT network connector 248, and/or IoT workflow manager 250 may serve as a trigger to invoke a subsequent workflow, perform a particular operation, process, and so forth.

IoT manager 240 includes logic that provides a data service. For example, IoT manager 240 includes logic that manages IoT management information. For example, IoT manager 240 communicates with IoT device 130 and is able to read and write IoT management information to and from a memory/storage of IoT device 130. According to an exemplary implementation, IoT manager 240 includes a graphical user interface that allows user 155 to enter new IoT management information, edit existing IoT management information, and read IoT management information stored at end device 150 and IoT device 130. When IoT device 130 includes a passive communication interface (e.g., NFC logic, RFID, etc.), IoT manager 240 may perform these tasks while IoT device 130 is turned off. Alternatively, when IoT device 130 does not include a passive communication interface, IoT manager 240 may perform these tasks while IoT device 130 is turned on. IoT manager 240 communicates with IoT management portal 117 and allows user 155 to upload IoT management information pertaining to IoT device 130. For example, user 155 may upload the IoT management information to IoT database 204. IoT manager 240 may also allow user 155 to view and edit IoT management information stored at IoT management portal 117.

IoT updater 242 includes logic that provides an updating service. For example, IoT updater 242 includes logic that manages the updating of IoT device 130. As previously described, according to an exemplary implementation, IoT updater 206 of IoT management portal 117 stores updates (e.g., software, firmware, etc.) pertaining to IoT devices 130. According to another exemplary implementation, IoT updater 206 stores URIs of the sites from which updates may be obtained. In view of these implementations, IoT updater 242 may communicate with IoT management portal 117 and/or a third party site and allows user 155 to select and download an update pertaining to IoT device 130 at end device 150. IoT updater 242 also allows user 155 to establish a connection with IoT device 130 via end device 150 and govern the installation of the update at IoT device 130. Typically, user 155 would power up or turn on IoT device 130 to install the update at IoT device 130.

Mapper 244 includes logic that provides a map service. For example, mapper 244 includes logic that displays a map of a location at which IoT devices 130 are to be installed and are installed. Depending on the location, the map may be representative of an indoor location or an outdoor location. As previously described, if needed, user 155 may upload a map file to mapper 208 of IoT management portal 117 to convert the map file to a format used by mapper 244. For example, user 155 may import the map file (e.g., a CAD file) of a multi-story building to mapper 244.

Mapper 244 includes logic of a maps editor. Mapper 244 permits user 155 to designate locations on the map at which IoT devices 130 are to be installed and are installed. For example, mapper 244 may provide various icons from which user 155 may select and place on the map to indicate an area at which IoT device 130 is to be installed or has been installed. Mapper 244 allows user 155 to update an icon or other element on the map as user 155 successfully installs IoT device 130. For example, mapper 244 may update the icon (e.g., a new icon, change the color of the icon, etc.) or add text (e.g., installed, not installed) near the icon to indicate, for this area, that IoT device 130 has changed from needing to be installed to installed. Mapper 244 may update the icon based on user input. For example, subsequent to the installation of IoT device 130, user 155 may enter an input indicating that IoT device 130 has been successfully installed at a given area within the map.

Mapper 244 may also allow user 155 to construct a map of a location. For example, mapper 244 may provide various tools that allow user 155 to create a structure. User 155 may be able to define the number, shape, and dimensions of a room, of a level (e.g., first floor, second floor, etc.), whether above ground or below ground (e.g., basement), and so forth. User 155 may construct a 2-D or a 3-D representation of the structure.

Depending on the capabilities of end device 150 and the infrastructure at a given location, mapper 244 includes logic that provides indoor/outdoor positioning, indoor/outdoor navigation and routing, and position calibration. According to an exemplary implementation, mapper 244 uses well-known technologies and techniques to provide outdoor positioning and outdoor navigation services, such as, for example, satellite positioning (e.g., GPS, Differential GPS (DGPS), Galileo, etc.) or cellular positioning (e.g., triangulation, Enhanced Observed Time Difference (E-OTD), Uplink Time Difference of Arrival (U-TDOA), assisted GPS, etc.). According to an exemplary implementation, mapper 244 uses well-known technologies and techniques to provide indoor positioning and indoor navigation services, such as, for example, Wi-Fi, Wireless Local Area Network (WLAN) positioning, Bluetooth positioning, IEEE 802.11 positioning, Ultra Wide Band (UWB) positioning, received signal strength (RSS), time of flight (TOF), angle of arrival (AOA), beacons (e.g., Bluetooth Beacons, etc.), and so forth. According to other exemplary implementations, mapper 244 uses a well-known server solution in which indoor positioning and navigation is provided to mapper 244 by a server device (e.g., a mobility services engine, etc.). In this way, mapper 244 may indicate the position of user 155 on the map and the positions of IoT device 130. Mapper 244 may present the map, which includes graphical elements (e.g., icons, etc.) to assist user 155 in locating the positions of IoT device 130, identifying which IoT devices 130 have been installed, identifying which IoT devices 130 have not been installed, providing a route from IoT device 130 that has just been installed to another IoT device 130 that has yet to be completely installed, etc. End device 150 may include components that support mapping services, such as a compass, a gyroscope, a GPS receiver, an accelerometer, a motion sensor, a barometric pressure sensor, and/or an altimeter.

IoT calibrator 246 includes logic that provides a calibration service. For example, IoT calibrator 246 includes logic of a workflow that guides user 155 to calibrate one or multiple sensors included in IoT device 130. For example, the workflow may instruct user 155 to have the sensor perform multiple measurements of different samples. The test IoT data resulting from the measurements is transmitted by IoT device 130 to IoT server 118. User 155 may access and view the test IoT data to determine whether the test IoT data is accurate in view of samples measured by the sensor. Alternatively, the test IoT data may be downloaded and IoT calibrator 246 may read the test IoT data to determine whether the measurements are accurate. In either implementation, when the test IoT data is accurate, the sensor is successfully calibrated. When the test IoT data is not accurate, user 155 may have various options. For example, user 155 may restart the calibration workflow. Alternatively, IoT calibrator 246 may provide diagnostic or debugging workflows. For example, IoT calibrator 246 may include a communication interface that allows user 155 to perform various tasks pertaining to a sensor, such as to reset the sensor, obtain log information pertaining to the configuration of the sensor (e.g., power supply (e.g., reference voltage, etc.), memory settings, etc.), reconfigure the sensor, etc. IoT calibrator 246 may also store a technical specification file for the sensor and instructions pertaining to configuration, installation to a circuit board, etc.

IoT network connector 248 includes logic that provides a connection service. For example, IoT network connector 248 includes logic of a workflow that guides user 155 to configure IoT device 130 to connect to the network (e.g., network 115). For example, user 155 may configure various communication settings, such as a particular wireless network (e.g., access network 105) for IoT device 130 to use, security type, security credentials, type of encryption, a destination address (e.g., IoT gateway 119, IoT calibrator 212 of IoT management portal 117, etc.), and so forth. As previously described, IoT gateway 119 provides an authentication and authorization service and manages the onboarding of IoT device 130 to the network.

IoT workflow manager 250 includes logic that provides a workflow service. For example, IoT workflow manager 250 includes logic that manages a workflow through which user 155 is to complete in order to successfully install IoT device 130. According to an exemplary implementation, the workflow may be governed by a strict sequence of tasks to be completed before user 155 can progress to the next task. According to other exemplary implementations, the workflow may not be governed by a strict sequence of tasks. IoT workflow manager 250 may invoke other elements of installer 152 (e.g., IoT manager 240, IoT updater 242, etc.) to guide user 155 to perform a particular task. IoT workflow manager 250 may communicate with a particular element to determine when a task has been completed. IoT workflow manager 250 may communicate with a particular element to initiate a particular task. For example, IoT workflow manager 250 may initiate a particular task to be performed by an element in response to a communication received from another element that indicates another task has been completed. Examples of triggering events that may indicate when a task is completed or when to initiate a subsequent task may include when user 155 enters certain information, the completion of transmitting data to a particular device, the completion of receiving data from a particular device, the completion of storing data, and so forth.

Figure 3:
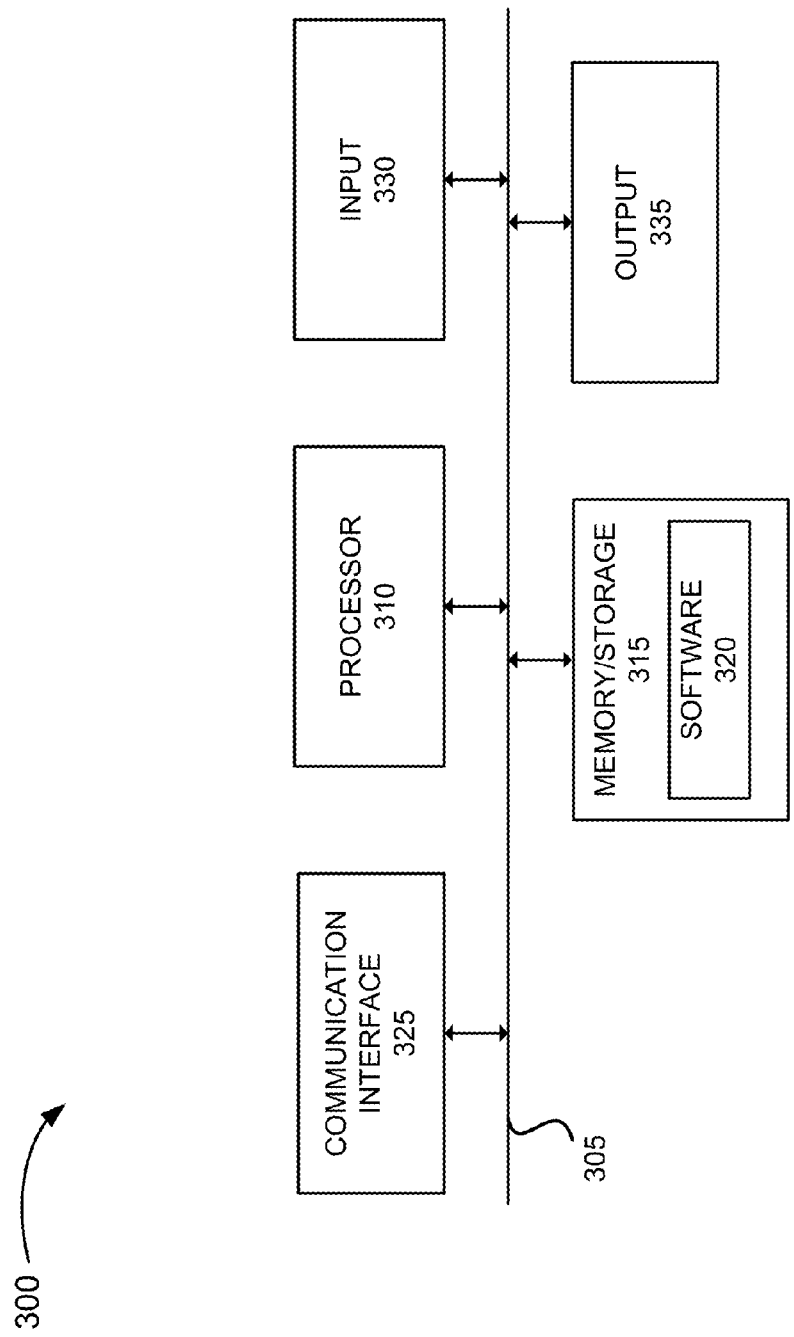
FIG. 3 is a diagram illustrating exemplary components of a device that may correspond to a network element and an end device depicted in the environment of FIG. 1.

FIG. 3 is a diagram illustrating exemplary components of a device 300. Device 300 may correspond to each of the network elements (e.g., IoT gateway 119, IoT management portal 117, etc.) and end device 150 depicted in environment 100. As illustrated in FIG. 3, according to an exemplary embodiment, device 300 includes a bus 305, a processor 310, memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray® disk (BD), etc.). Memory/storage 315 may store data, software, and/or instructions related to the operation of device 300.

Software 320 includes an application or a program that provides a function and/or a process. Software 320 is also intended to include firmware, middleware, microcode, hardware description language (HDL), and/or other form of instruction. By way of example, with respect to the network elements that include logic to provide the IoT services, these network elements may be implemented to include software 320. Additionally, for example, end device 150 may include software 320 (e.g., installer 152) to perform tasks as described herein.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include an antenna. Communication interface 325 may operate according to a protocol stack and a communication standard. Communication interface 325 may include various processing logic or circuitry (e.g., multiplexing/de-multiplexing, filtering, amplifying, converting, error correction, etc.). According to an exemplary embodiment, end device 150 includes multiple communication interfaces 325. For example, end device 150 includes a near field communication interface or other short-range communication interface, which may be used to communicate with IoT device 130. Additionally, for example, end device 150 includes a long-range communication interface, which may be used to communicate with access network 105. Similarly, according to an exemplary embodiment, IoT device 130 may include multiple communication interfaces 325. For example, IoT device 130 may include a short-range communication interface and a long-range communication interface. Examples of short-range communication interfaces (e.g., near field, Bluetooth, etc.) and long-range communication interfaces (e.g., LTE, GSM, LoRa, etc.) have been described.

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

FIGS. 4A-4F are diagrams that illustrate exemplary processes pertaining to the IoT installation platform. According to an exemplary scenario, user 155 wishes to install IoT devices 130 in various rooms included in a building. Each IoT device 130 includes multiple sensors directed to sensing various environmental conditions (e.g., temperature, humidity, etc.). It may be assumed that user 155 has already selected and installed installer 152 at end device 150.

Figure 4A:
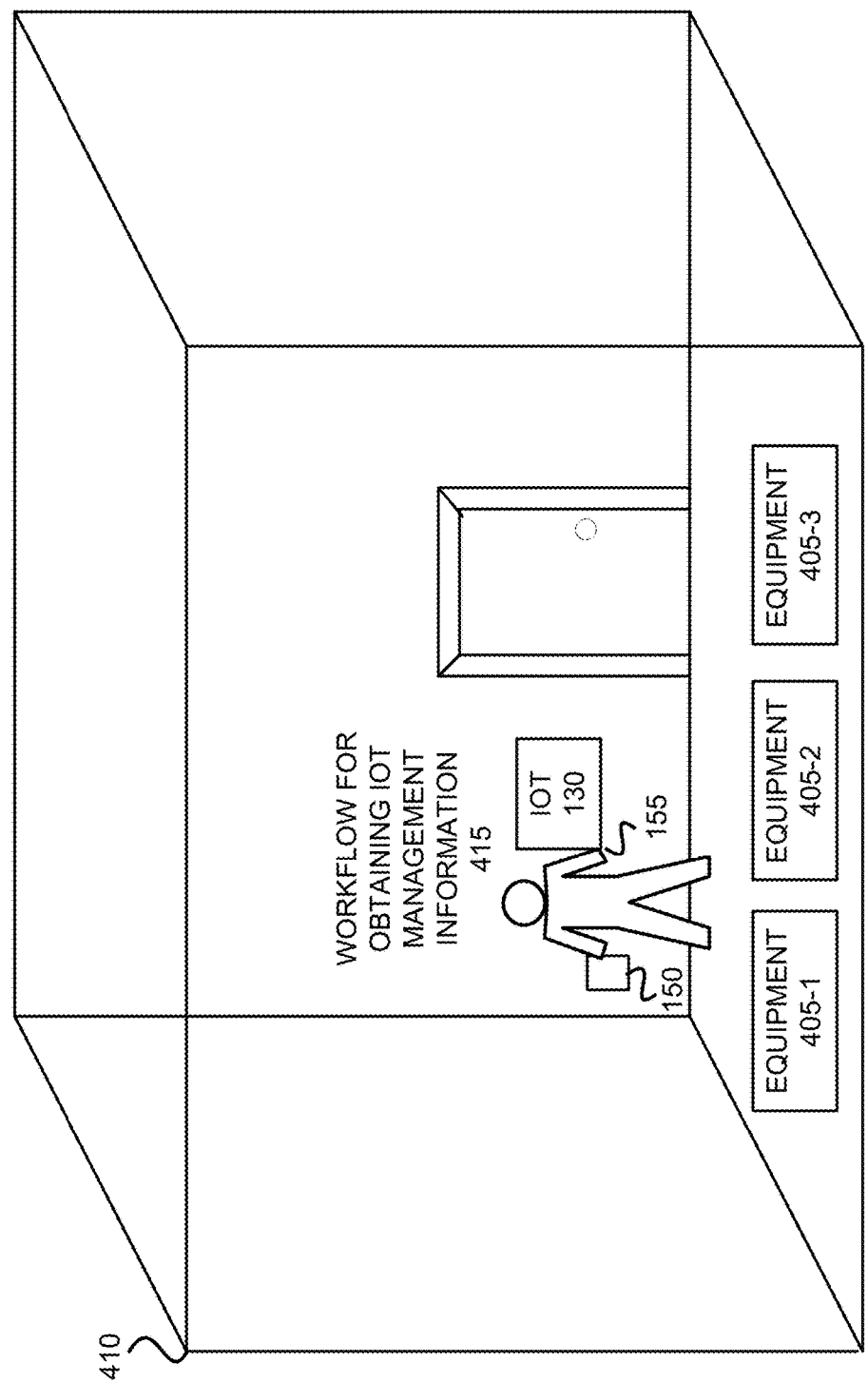
FIGS. 4A-4F are diagrams that illustrate exemplary processes pertaining to an exemplary embodiment of the IoT installation platform in view of an exemplary scenario.

Referring to FIG. 4A, assume that user 155 enters a room 410 that stores equipment 405-1 through 405-3. User 155 executes installer 152. According to this example, installer 152 provides a workflow for obtaining IoT management information 415 (also referred to as workflow 415). For example, according to various scenarios, user 155 may read IoT management information from a sticker attached to IoT device 130 and/or enter IoT management information, by user 155, into installer 152 via a graphical user interface. Additionally, or alternatively, installer 152 may read IoT management information via a near field connection between end device 150 and a memory of IoT device 130. For example, workflow 415 may prompt user 155 to bring end device 150 close to IoT device 130 and IoT manager 240 may pair with IoT device 130 and read any available IoT management information stored in an on-board memory of IoT device. According to various scenarios, IoT device 130 may be turned on or not turned on. As previously described, user 155 may write IoT management information to the memory of IoT device 130. Additionally, user 155 may upload IoT management information to IoT management portal 117 (e.g., IoT database 204). Subsequent to successfully uploading the IoT management information, IoT workflow manager 250 initiates a workflow pertaining to mapping IoT device 130.

Figure 4B:
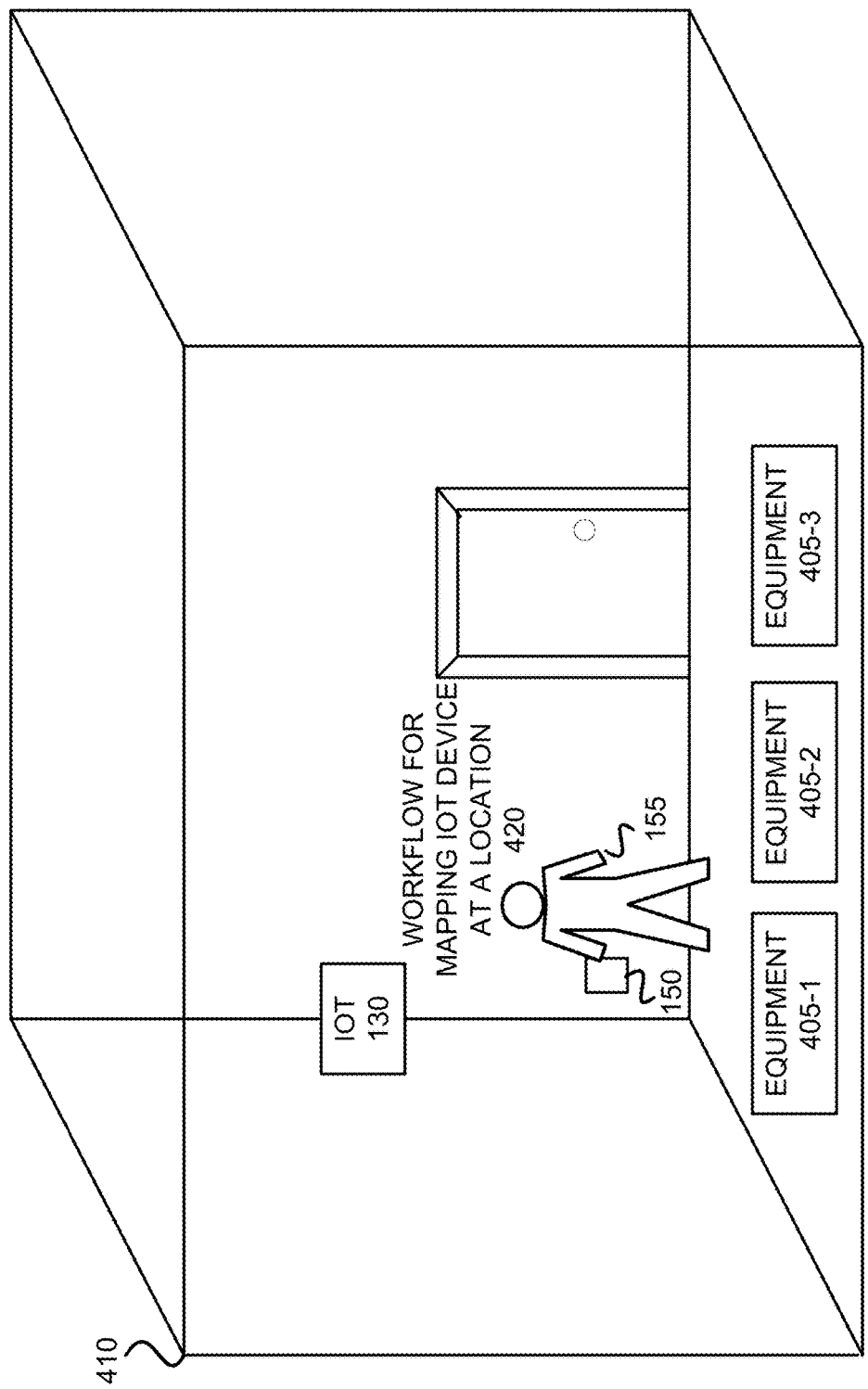

Referring to FIG. 4B, according to a workflow for mapping IoT device at a location 420 (also referred to as workflow 420), installer 152 prompts user 155 to view the map of the building and the room that user 155 desires to install IoT device 130. User 155 opens the map. According to one example, workflow 420 may prompt user 155 to designate a position on the map in room 410 that represents the location where IoT device 130 is to be installed. According to another example, user 155 may have previously designated the position on the map in room 410 for IoT device 130. In either case, assume the map indicates a position (e.g., as an icon) in room 410 where IoT device 130 is to be installed. Upon review of the map, user 155 places IoT device 130 in a corner of room 410 corresponding to the designated position. According to this example, user 155 uses end device 150 to identify the x, y, and z coordinates corresponding to the position where IoT device 130 is to be placed. If not already stored in IoT management portal 117, user 155 may upload or add the location coordinates of IoT device to the IoT management information. Workflow 420 may prompt user 155 to indicate when IoT device 130 is placed at the designated location. User 155 indicates that IoT device 130 is placed at the designated location. Subsequent to successfully placing IoT device 130 in the designated location or uploading the IoT management information, IoT workflow manager 250 initiates a workflow pertaining to the updating of IoT device 130.

Figure 4C:
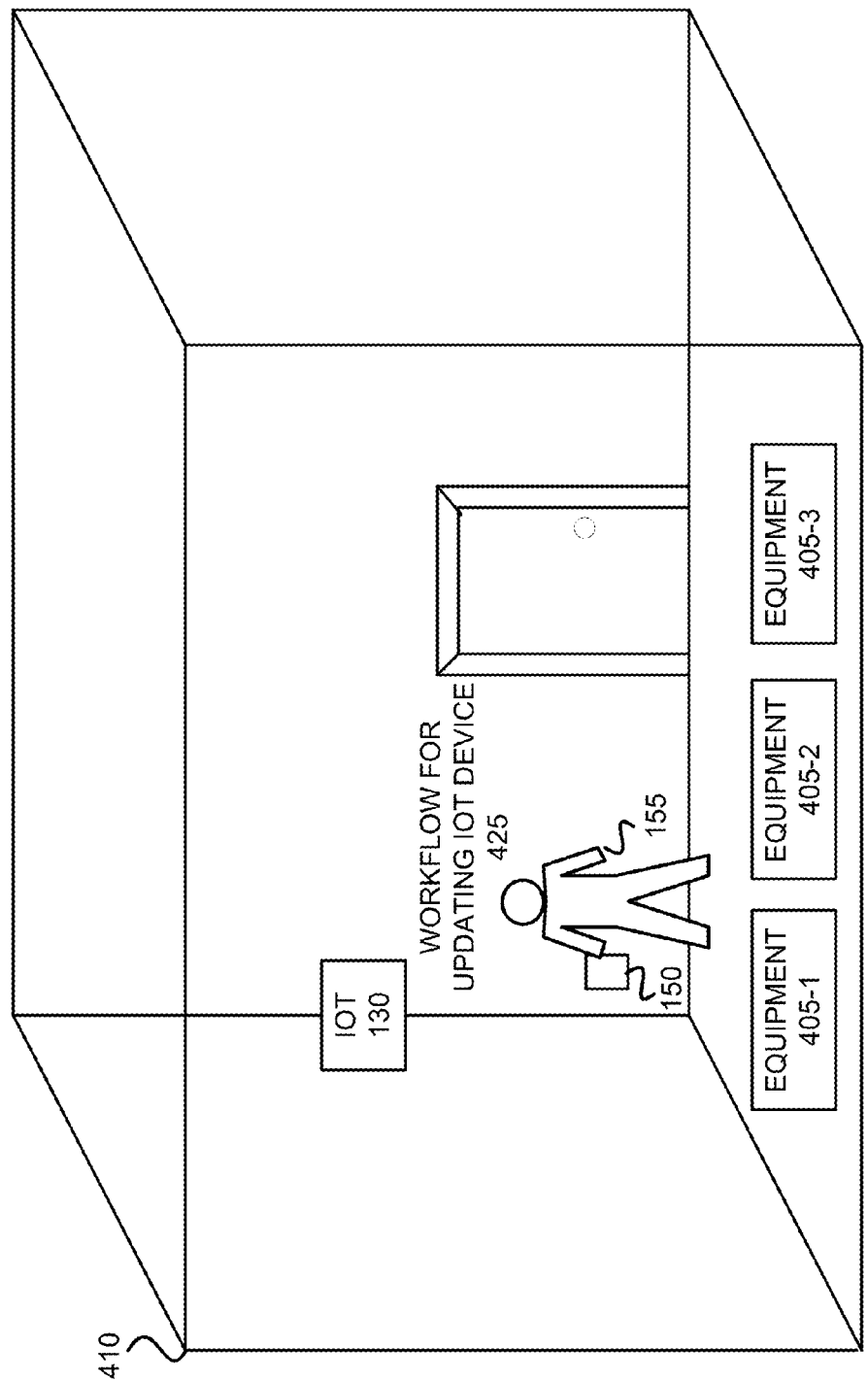

Referring to FIG. 4C, according to a workflow for updating software/firmware 425 (also referred to as workflow 425), installer 152 prompts user 155 to install any updates to IoT device 130, if such updates exist. For example, workflow 425 may request that user 155 establish a connection with IoT management portal 117. User 155 may log in to IoT management portal 117 and navigate to IoT updater 206. According to one example, user 155 may be prompted to enter certain information pertaining to IoT device and/or a sensor included in IoT device 130 (e.g., make and model, a user-assigned identifier, an equipment identifier, etc.). Based on the entered information, IoT updater 206 may compare version information stored in IoT management information with update information pertaining to IoT device 130 and/or the sensor. Depending on the result of the comparison, IoT updater 206 may indicate to user 155 that an update is available or not. In the case that an update is not available, user 155 may indicate to installer that no update is necessary and in response, IoT workflow manager 250 may initiate a workflow pertaining to the calibration of IoT device 130. However, in the case that an update is available, according to one example, IoT updater 206 indicates whether the update is available from IoT updater 206 or a third party site. When the update is available at the third party site, IoT update 206 may display, for example, the URI of the third party site (e.g., as a hyperlink) or redirect end device 150 to the third party site based on the URI. In either case, user 155 selects and downloads the update from IoT updater 206 or the third party site.

Upon successfully downloading the update, workflow 425 prompts user 155 to turn on IoT device 130. Thereafter, workflow 425 provides various graphical user interfaces that guide user 155 to transfer and store the update to IoT device 130 and perhaps perform other tasks (e.g., execute the updated software at IoT device 130, etc.). Thereafter, user 155 may indicate that IoT device 130 and/or a sensor has been successfully updated. Subsequent to successfully installing the update at IoT device 130, IoT workflow manager 250 may initiate a workflow pertaining to the calibration of IoT device 130. According to some examples, user 155 may update the IoT management information (e.g., version information) stored at IoT management portal 117.

Figure 4D:
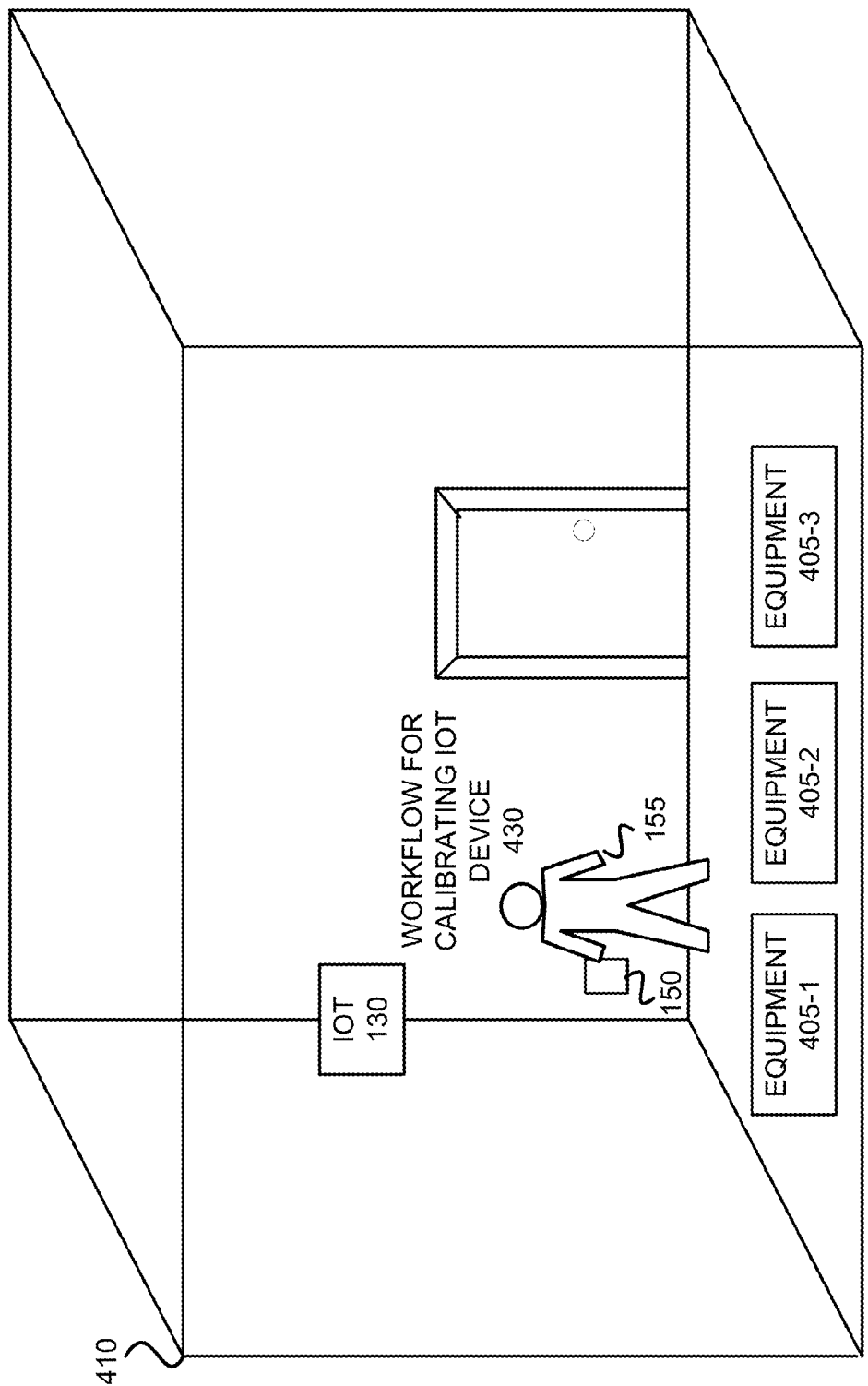

Referring to FIG. 4D, according to a workflow for calibrating 430 (also referred to as workflow 430), installer 152 prompts user 155 to calibrate sensors included in IoT device 130. According to this example, during the selection of installer 152 in IoT application store 210 of IoT management portal 117, user 155 had indicated that IoT device 130 included temperature and humidity sensors. Based on this information, installer 152 includes workflows for calibrating temperature and humidity sensors. According to other examples, IoT device 130 may not include a sensor or components that require calibration and correspondingly installer 152 may not include a workflow pertaining to certain steps regarding calibration. However, installer 152 may still include a workflow to configure IoT device 130 so that IoT device 130 is able to connect to the network and transmit IoT data to IoT server 118.

As explained above, according to this example, installer 152 includes workflow 430 that will guide user 155 to calibrate a temperature sensor and a humidity sensor. For example, workflow 430 may prompt user 155 to perform certain tasks so that the temperature sensor may measure various temperatures. Workflow 430 may also allow user 155 to configure communication settings so that IoT device 130 transmits the test IoT data to IoT calibrator 212 of IoT management portal 117. According to this example, assume that user 155 performs the tasks for calibrating the temperature sensor and the test IoT data transmitted and stored at IoT management portal 117 is correct. For example, user 155 may communicate with IoT management portal 117, via end device 150, to confirm whether the test IoT data was successfully communicated and whether the test IoT data is accurate given the test temperatures used. Thereafter, workflow 430 guides user 155 through calibration tasks for the humidity sensor, which user 155 performs. IoT device 130 transmits the test IoT data to IoT management portal 117. According to this example, while the test IoT data is stored at IoT management portal 117, the test IoT data is not accurate. In response, user 155 may indicate via installer 152 a desire to troubleshoot.

Figure 4E:
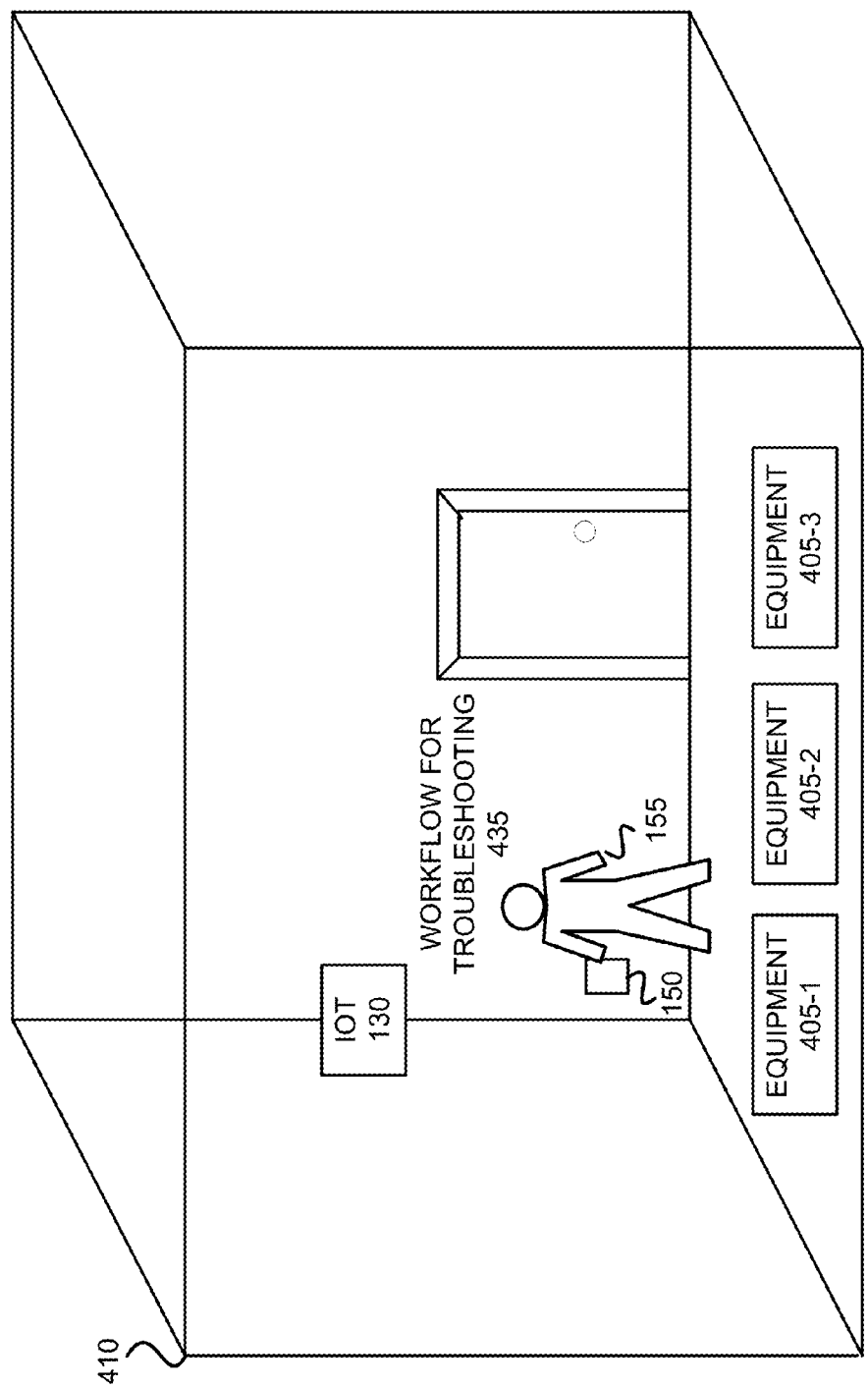

Referring to FIG. 4E, according to a workflow for troubleshooting 435 (also referred to as workflow 435), user 155 may select from various troubleshooting options to identify and correct the issue with the humidity sensor. According to an exemplary implementation, workflow 435 allows user 155 to designate the issue. For example, user 155 may indicate that the humidity readings, which were indicated by the test IoT data, were off by a certain percentage. Based on the problem indicated by user, workflow 435 may guide user 155 through one or multiple troubleshooting workflows in an effort to resolve the inaccurate readings. By way of example, workflow 435 may select a troubleshooting task, based on the issue designated by user 155. For example, installer 152 may present instructions that guides user 155 to obtain the current configuration settings from the humidity sensor and confirm that each of the settings are aligned with the specification for the humidity sensor. According to this example, user 155 discovers that the humidity sensor is operating off of a voltage that is lower than indicated by the specification. User 155 makes the appropriate adjustment by reconfiguring a voltage level parameter pertaining to the humidity sensor. Subsequent to reconfiguring the voltage level parameter, user 155 restarts the calibration process for the humidity sensor. User 155 performs again the calibration tasks and verifies whether the test IoT data is accurate. User 155 determines that the test IOT data is stored at IoT management portal 117 and the test IoT data is now accurate. User 155 indicates via installer 152 that the humidity sensor is calibrated. Subsequent to successfully calibrating IoT device 130, IoT workflow manager 250 initiates a workflow for IoT data transmission.

Figure 4F:
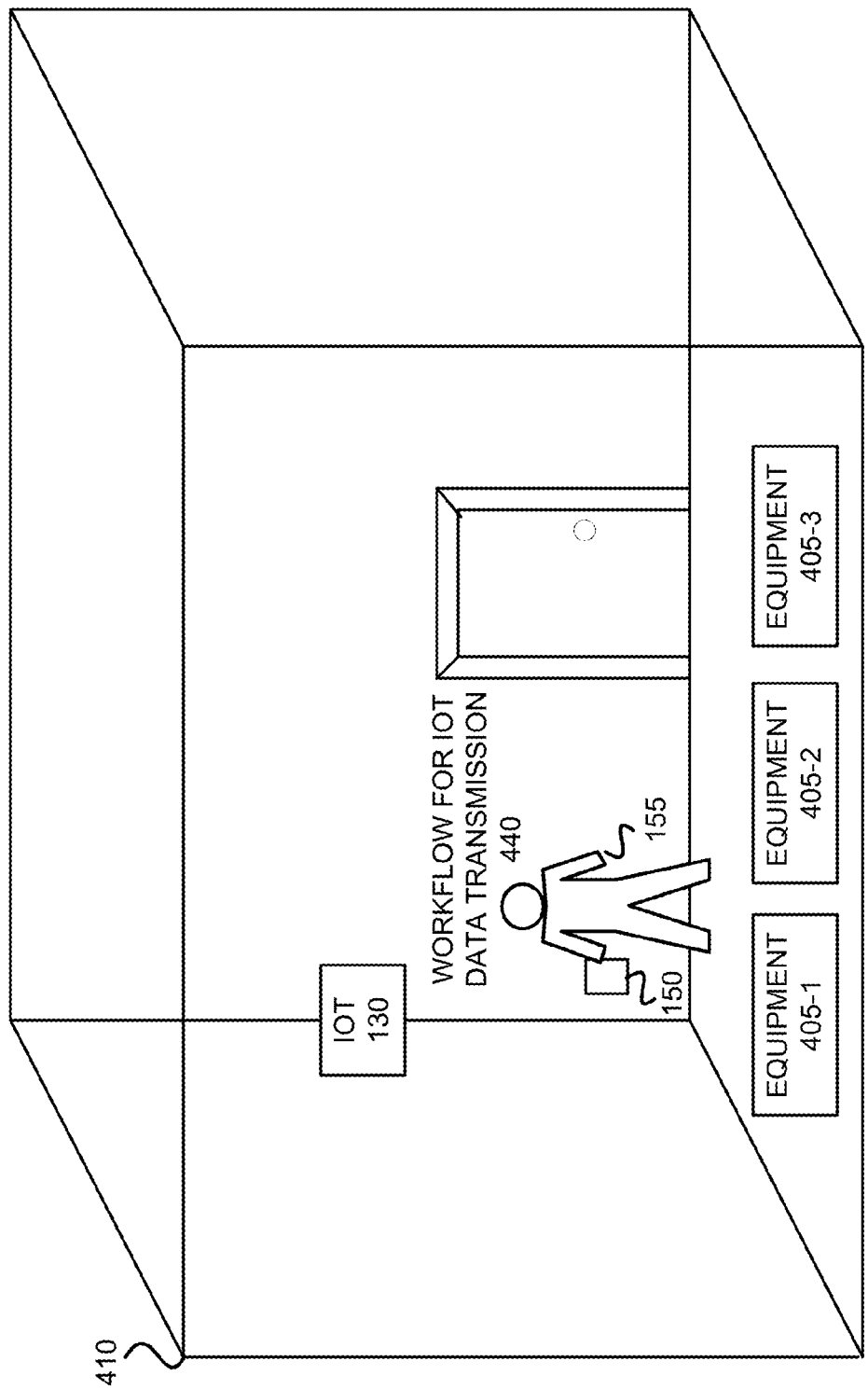

Referring to FIG. 4F, according to a workflow for IoT data transmission 440 (also referred to as workflow 440), user 155 may configure communication settings of IoT device 130 so that IoT device 130 transmits IoT data to IoT server 118. Depending on the IoT device 130, user 155 may configure other settings, such as the frequency of communication to IoT server 118, etc. According to this example, after configuring the IoT device 130, IoT device 130 may begin transmitting IoT data to IoT server 118. User 155 may or may not be able to verify whether the IoT data was successfully communicated and stored at IoT data store 232. For example, depending on whether IoT server 118 is a third party device, etc., user 155 may or may not be able to perform this task. When user 155 is able to verify that the IoT data was successfully communicated to IoT server 118, user 155 may conclude that IoT device 130 has been successfully installed. Alternatively, when user 155 is not able to verify that the IoT data was successfully communicated to IoT server 118, user 155 may still conclude that IoT device 130 has been successfully installed. In either case, user 155 may indicate via installer 152 that IoT device 130 was successfully installed. User 155 may access the map and proceed to another room. For example, the map may assist user 155 to reach the next room at which a next IoT device 130 is to be installed.

When user 155 is able to verify whether the communication was successfully communicated to IoT server 118, user 155 may conclude that IoT device 130 has not been successfully installed. For example, the IoT data may not be stored in IoT server 118. User 155 may generate a trouble ticket via end device 150. User 155 may transmit the trouble ticket to a customer service center (not illustrated).

Although FIGS. 4A-4F illustrate exemplary processes pertaining to the IoT installation platform, according to other embodiments and/or scenarios, a process may include additional operations, fewer operations, and/or different operations than those illustrated and described.

Figure 5:
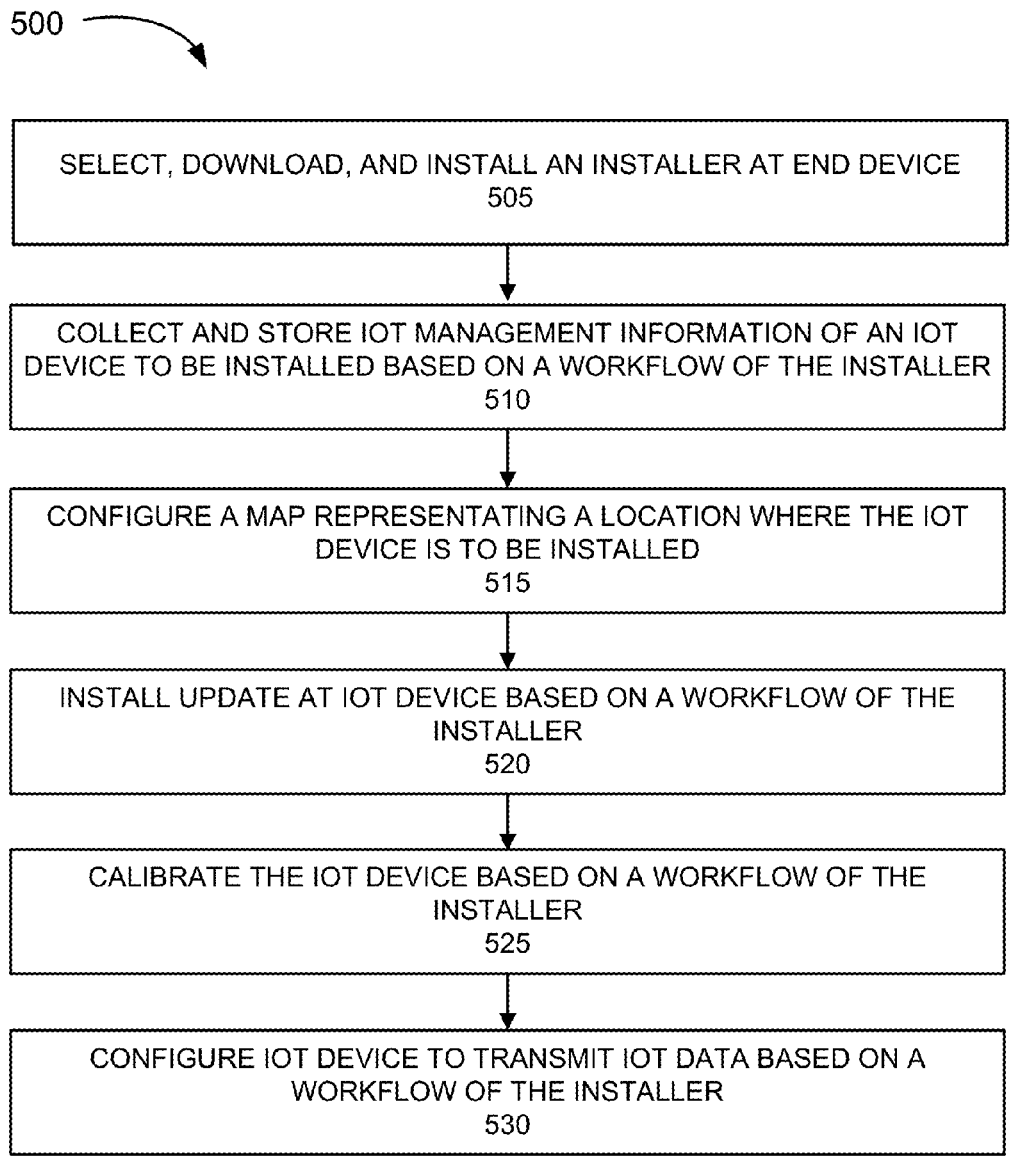
FIG. 5 is a flow diagram illustrating an exemplary process pertaining to an exemplary embodiment of the IoT services.

FIG. 5 is a flow diagram illustrating an exemplary process 500 pertaining to the IoT installation platform. Process 500 is directed to processes previously described with respect to FIGS. 2A-2D, 4A-4F, and elsewhere in this detailed description. According to an exemplary embodiment, installer 152, IoT management portal 117, and/or IoT gateway 119 performs the steps of process 500. For example, processor 310 executes software 320 to perform the steps described.

Referring to FIG. 5, in block 505, an installer is selected, downloaded, and installed at an end device. For example, IoT application store 210 of IoT management portal 117 provides a store service that includes various installers 152 pertaining to various IoT devices 130. User 155 may access IoT application store 210 via a client (e.g., a web browser) of end device 150. User 155 provides a portion of IoT device information. For example, user 155 may provide make and model of IoT device 130, the number and the type of sensors included in IoT device 130 (if any), and type of short-range communication interface (e.g., NFC-passive, none, Bluetooth, etc.). User 155 may also provide end device information (e.g., make/model, operating system, desktop, etc.) to IoT application store 210. IoT application store 210 analyzes the information provided and selects the appropriate installer 152 to download and install at end device 150. IoT application store 210 presents a link for selection by user 155 to initiate the downloading and installation at end device 150 based on the selection.

In block 510, IoT management information of an IoT device to be installed is collected and stored based on a workflow of the installer. For example, IoT manager 240 of installer 152 at end device 150 provides a workflow that collects and stores IoT management information at IoT database 204. Depending on the installer 152 downloaded, the workflow to perform this task may vary. For example, in step 505, if user 155 indicated that IoT device 130 does not include a short-range communication interface, then IoT manager 240 may select long-range communication technologies for discovering and establishing a connection with IoT device 130. Alternatively, in step 505, if user 155 indicated that IoT device 130 includes an active NFC, then IoT manager 240 may prompt user 155 to turn on IoT device 130 before attempting to discover and establish a connection with IoT device 130. According to another example, in step

505, if user 155 indicated that IoT device 130 includes a passive NFC, then IoT manager 240 may automatically establish a connection between end device 150 and IoT device 130. Subsequent to the establishment of the connection, IoT manager 240 reads IoT management information from IoT device 130 (e.g., a memory included in the NFC, internal memory, etc.) and stores at end device 130 the IoT management information read.

IoT manager 240 may analyze the IoT management information stored and determine whether there is IoT management information missing. For example, IoT manager 240 may be configured to collect certain IoT management information (e.g., supplement IoT management information collected from user 155 in step 505) for upload to IoT database 204. According to one example, IoT manager 240 may establish a connection between end device 150 and IoT database 204. IoT manager 240 may compare the IoT management information collected at end device 150 with the IoT management information stored at IoT database 204. According to one example, when IoT manager 240 determines that the IoT management information stored at IoT database 204 is incomplete despite the IoT management information collected, IoT manager 240 prompts user 155 to supply the missing IoT management information. For example, IoT manager 240 presents a graphical user interface that includes one or multiple input fields that designate particular IoT management information for user 155 to provide. User 155 may then enter the particular IoT management information and IoT manager 240 uploads the IoT management information stored at end device 150 to IoT database 204. According to another example, when IoT manager 240 determines that the IoT management information stored at IoT database 204 is complete in view of the IoT management information collected, IoT manager 240 uploads the IoT management information to IoT database 204.

Additionally, IoT manager 240 of installer 152 provides a workflow in which the IoT management information is stored at IoT device 130. For example, depending whether IoT management information is collected from a memory of IoT device 130, and if so, the type of IoT management information read therefrom, IoT manager 240 may store additional IoT management information at IoT device 130. For example, IoT manager 240 may present a graphical user interface that includes one or multiple input fields that designate IoT management information that user 155 may wish to store at IoT device 130. For example, user 155 may wish to store a unique user-assigned identifier for IoT device 130 (e.g., a number (e.g., "79"), a name (e.g., "room 25"), or some other string). IoT manager 240 writes IoT management information to the memory of IoT device 130. Similar to that described above, depending on the installer 152 downloaded, the workflow to perform this task may vary.

In block 515, a map, which is representative of a location where the IoT device is to be installed, is configured. For example, mapper 244 of installer 152 at end device 150 may guide user 155 through a workflow that generates a map representative of a location (e.g., indoors) at which IoT devices 130 are to be installed. Alternatively, mapper 244 may use an existing map (e.g., outdoors), upload a map file to mapper 208 and receive a converted map file, etc., as previously described.

Mapper 244 may also guide user 155 to designate location points on the map to indicate where IoT devices 130 are to be installed. According to one example, mapper 244 presents the map to user 155 in response to IoT manager 240 storing the IoT management information at IoT device 130 or at IoT database 240. As the map is displayed to user 155, mapper 244 determines whether any a location point currently exists based on icon data stored along with the map. When mapper 244 determines that the map does not include a location point, mapper 244 prompts user 155 to designate a location point for IoT device 130. Additionally, or alternatively, based on the navigation service, mapper 244 may determine whether the location point exists in the position where user 155 may be displayed on the map or proximate thereto. For example, since IoT manager 240 may have recently stored IoT management information at IoT device 130, mapper 244 may determine based on the data indicating user 155's current position whether a location point for IoT device 130 currently exists in the proximate area. Depending on the coordinates desired (e.g., latitude and longitude versus latitude, longitude, and altitude), mapper 244 may obtain from another device, end device 150, user 155, etc, location information and/or a place on the map (e.g., user 155 touching a point on the map with his/her finger, etc.). Upon receipt of the location information or designation, mapper 244 indicates the position of IoT device 130 on the map.

Mapper 244 updates the location points as IoT devices 130 are successfully installed. For example, mapper 244 may update a location to indicate that IoT device 130 is successfully installed in response to IoT network connector 248 indicating the workflow for configuring IoT device 130 to transmit IoT data has been completed. Mapper 244 of installer 152 may provide other map-related service, such as navigation to location points in which IoT devices 130 have yet to be installed, determine coordinates of the location points, etc., as previously described.

In block 520, an update for the IoT device is installed based on a workflow of the installer. For example, IoT updater 242 of installer 152 at end device 150 may guide user 155 through a workflow that determines whether an update for IoT device 130 is available. According to one example, IoT updater 242 may establish a connection with IoT updater 206 in response to mapper 244 obtaining a location point for IoT device 130. In response to the establishment of the connection, a log-in screen of IoT management portal 117 may be presented to user 155. User 155 may be prompted to enter certain information pertaining to IoT device 130 and/or sensor. IoT updater 206 uses the information obtained from user 155 to determine whether IoT device 130 should be updated. When an update is available, IoT updater 242 of installer 152 may obtain the update from IoT updater 206 of IoT management portal 117 or a third party site.

IoT updater 242 of installer 152 may also guide user 155 through a workflow that transfers the update from end device 150 to IoT device 130 and installs the update at IoT device 130. For example, in response to storing the update at end device 150, IoT updater 242 determines whether a connection to IoT device 130 can be made. Since IoT device 130 may have to be powered on to install the update, IoT updater 242 may perform a discovery process that uses a particular radio type (e.g., LTE, etc.) versus a passive NFC, etc. In the event that IoT updater 242 is unable to establish a connection with IoT device 130, in response, IoT updater 242 may present a prompt via present a graphical user interface that requests user 155 to power on IoT device 130. However, in the event that IoT updater 242 is able to establish the connection with IoT device 130, in response, IoT updater 242 may transmit the update to IoT device 130.

In block 525, the IoT device is calibrated based on a workflow of the installer. For example, IoT calibrator 246 of installer 152 at end device 150 may guide user 155 through a workflow that calibrates one or multiple sensors included in IoT device 130. For example, the workflow of IoT calibrator 246 includes measuring samples by IoT device 130, transmitting test IoT data to IoT calibrator 212 of IoT management portal 117, verifying the accuracy of the test IoT data, troubleshooting and diagnosing, reconfiguring IoT device 130, and so forth, as previously described.

In block, 530, the IoT device is configured to transmit IoT data to a destination device based on a workflow of the installer. For example, IoT network connector 248 of installer 152 at end device 150 may guide user 155 through a workflow that configures IoT device 130 to transmit IoT data to a destination device (e.g., IoT server 118). According to one example, IoT network connector 248 may establish a connection with IoT device 130 in response to receiving a user input indicating that a sensor is calibrated. In response to the establishment of the connection, IoT network connector 248 may present a graphical user interface in which parameters for IoT device 130 may be configured to allow IoT device 130 to transmit the IoT data to the destination device. IoT network connector 248 may also include IoT data verification, opening a trouble ticket, etc., as previously described.

Although FIG. 5 illustrates an exemplary process pertaining to the IoT installation platform, according to other embodiments, process 500 may include additional operations, fewer operations, and/or different operations than those illustrated in FIG. 5, and as described herein. For example, as previously described, according to an exemplary implementation, IoT workflow manager 250 may govern the sequence of workflows to be completed in order to install IoT device 130. IoT workflow manager 250 may invoke a subsequent workflow in response to determining the completion of a currently executing workflow. According to various implementations, IoT workflow manager 250 may make such determinations based on user input, completion of a transmission, etc., which serve as a triggering event.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while a series of blocks has been described with regard to the process illustrated in FIG. 5, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 310, a sensor, etc.), or a combination of hardware and software (e.g., software 320). The embodiments have been described without reference to the specific software code since the software code can be designed to implement the embodiments based on the description herein and commercially available software design environments/languages.

In the preceding specification, various embodiments have been described with reference to the accompanying drawings. However, various modifications and changes may be made thereto, and additional embodiments may be implemented, without departing from the broader scope of the invention as set forth in the claims that follow and various obvious modifications and equivalent arrangements. The specification and the drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 310) of a computational device. A non-transitory storage medium includes one or more of the storage mediums described in relation to memory/storage 315.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the specification or illustrated in the drawings should be construed as critical or essential to the embodiments described herein unless explicitly described as such.

What is claimed is:

1. A method comprising:

storing, by an end device in a memory, Internet of Things (IoT) management information that includes IoT device information of an IoT device to be installed at a location, wherein the end device includes installer software that includes a workflow, wherein the workflow includes interactive graphical user interfaces that guide a user of the end device through tasks of an installation process that provisions the IoT device, and wherein during an execution of the workflow at the end device the IoT management information is stored at the end device;

uploading, by the end device, the IoT management information to a network device in response to the storing and based on the workflow;

storing, by the end device, the IoT management information at the IoT device in response to the uploading and based on the workflow;

displaying, by the end device via a display of the end device, a map of the location;

receiving, by the end device, from the user, a designation of a location point on the map that indicates where the IoT device is to be installed, based on the displaying and the workflow;

determining, by the end device, whether the IoT device is to be updated based on the workflow and the IoT device information;

updating, by the end device, firmware or software at the IoT device in response to determining that an update for the IoT device is available and based on the workflow;

calibrating, by the end device, one or more sensors of the IoT device in response to the updating and based on the workflow; and configuring, by the end device, the IoT device to transmit IoT data to another network device in response to the calibrating and based on the workflow.

2. The method of claim 1, wherein the determining further comprises:

comparing the IoT management information that includes version information of the IoT device with update information that includes version information pertaining to the IoT device;

determining whether the IoT device is to be updated in response to the comparing of the version information included in the IoT management information and the version information included in the update information; and presenting an indication to the user that the IoT device is to be updated in response to determining that the version information included in the IoT management information and the version information included in the update information do not match.

3. The method of claim 1, wherein the calibrating further comprises:

configuring the IoT device to measure one or more samples;

configuring the IoT device to transmit test IoT data to the network device, wherein the test IoT data includes one or more values in correspondence to one or more measurements, performed by the IoT device, of the one or more samples;

establishing a connection between the end device and the network device; and presenting the test IoT data to the user via the end device and the connection.

4. The method of claim 1, further comprising:

receiving, by the network device, from the user via the end device, sensor information that indicates a number and a type of the one or more sensors included in the IoT device;

receiving, by the network device, from the user via the end device, end device information that indicates an operating system of the end device and a type of the end device;

selecting, by the network device, the installer software from among multiple versions of the installer software that includes multiple versions of the workflows based on the sensor information and the end device information; and offering, by the network device, to the user of the end device to download the installer software in response to the selecting.

5. The method of claim 1, further comprising:

determining, by the end device, geographic coordinates of the location point on the map based on the workflow;

uploading, by the end device, the geographic coordinates to the network device based on the workflow;

storing the geographic coordinates with the IoT management information based on the workflow; and receiving one or more designations of one or more location points on the map that indicate where one or more other IoT devices are to be installed based on the workflow.

6. The method of claim 1, further comprising:

displaying, by the end device, location points on the map, wherein each location point indicates where each IoT device is to be installed at the location, based on the workflow; and updating, by the end device, a presentment of each location point on the map to indicate that each IoT device is successfully installed at each location point in correspondence to a progress of the user successfully installing each IoT device at each location point and based on the workflow.

7. The method of claim 1, wherein the storing the IoT management information at the end device further comprises:

pairing, by the end device, with the IoT device based on the workflow, wherein the IoT device is turned off and a connection is established between the end device and the IoT device; and reading, by the end device via the connection, at least a portion of the IoT management information from a memory of the IoT device based on the workflow, and wherein the storing of the IoT management information at the IoT device further comprises:

writing, by the end device and via the connection, all of the IoT management information to the memory of the IoT device based on the workflow, wherein the IoT management information includes a user-assigned identifier of the IoT device and the IoT device information includes an equipment identifier, a make and a model of the IoT device, security credentials, and a number and type of the one or more sensors included in the IoT device.

8. The method of claim 1, wherein the calibrating further comprises:

receiving, by the end device, a user input indicating a calibration error pertaining to one of the one or more sensors included in the IoT device;

selecting, by the end device, a troubleshoot task in response to receiving the user input and based on the workflow; and guiding, by the end device, the user to perform the troubleshoot task in response to the selecting and based on the workflow.

9. A device comprising:

a display;

a first communication interface;

a second communication interface;

a memory, wherein the memory stores installer software that includes a workflow, wherein the workflow includes interactive graphical user interfaces that guide a user of the device through tasks of an installation process that provisions an Internet of Things (IoT) device; and a processor, wherein the processor executes instructions of the installer software to:
store IoT management information that includes IoT device information of the IoT device to be installed at a location;
upload, via the second communication interface, the IoT management information to a network device in response to the storing of the IoT management information;
store, via the first communication interface, the IoT management information at the IoT device in response to the upload;
present, via the display, a map of the location;
receive a designation of a location point on the map that indicates where the IoT device is to be installed based on the presentment of the map;
determine whether the IoT device is to be updated based on the IoT device information;
update, via the first communication interface, firmware or software at the IoT device in response to a determination that an update for the IoT device is available;
calibrate one or more sensors of the IoT device in response to the update at the IoT device; and
configure the IoT device to transmit IoT data to another network device in response to the calibration of the one or more sensors.

10. The device of claim 9, wherein when calibrating, the processor further executes the instructions to:
configure the IoT device to measure one or more samples;
configure the IoT device to transmit test IoT data to the network device;
establish, via the second communication interface, a connection between the device and the network device, wherein the test IoT data includes one or more values in correspondence to one or more measurements, performed by the IoT device, of the one or more samples; and
present, via the display, the test IoT data to the user based on the connection.

11. The device of claim 9, wherein the processor further executes the instructions to:
determine geographic coordinates of the location point on the map based;
upload, via the second communication interface, the geographic coordinates to the network device; and
receive one or more designations of one or more location points on the map that indicate where one or more other IoT devices are to be installed.

12. The device of claim 9, wherein the processor further executes the instructions to:
present, via the display, location points on the map, wherein each location point indicates where each IoT device is to be installed at the location; and
update a presentment of each location point on the map, via the display, to indicate that each IoT device is successfully installed at each location point in correspondence to a progress of the user successfully installing each IoT device at each location point.

13. The device of claim 9, wherein the processor further executes the instructions to:
pair, via the first communication interface, with a communication interface of the IoT device, wherein the IoT device is turned off and a connection is established between the device and the IoT device; and
read via the connection at least a portion of the IoT management information from a memory included in the communication interface of the IoT device in response to the establishment of the connection with the IoT device, and wherein when storing the IoT management information at the IoT device, the processor further executes the instructions to:
write via the connection all of the IoT management information to the memory, wherein the IoT management information includes a user-assigned identifier of the IoT device and the IoT device information includes an equipment identifier, a make and a model of the IoT device, security credentials, and a number and type of the one or more sensors included in the IoT device.

14. The device of claim 9, wherein when calibrating, the processor further executes the instructions to:
receive a user input indicating a calibration error pertaining to one of the one or more sensors included in the IoT device;
select a troubleshoot task in response to the user input; and
guide the user, based on presentment of information via the display, to perform the troubleshoot task in response to the selection of the troubleshoot task.

15. The device of claim 9, wherein the first communication interface includes a near field communication interface and the second communication interface includes at least one of a Long Term Evolution communication interface or a LoRa interface.

16. A non-transitory computer-readable storage medium that stores installer software that includes instructions of a workflow, executable by a processor of a computational device, wherein the workflow includes interactive graphical user interfaces that guide a user of the computational device through tasks of an installation process that provisions an IoT device, which when executed cause the computational device to:
store Internet of Things (IoT) management information, which includes IoT device information of the IoT device to be installed at a location, at the computational device;
upload the IoT management information to a network device in response to the storing of the IoT management information;
store the IoT management information at the IoT device in response to the upload;
present a map of the location;
receive a designation of a location point on the map that indicates where the IoT device is to be installed based on the presentment of the map;
determine whether the IoT device is to be updated based on the IoT device information;
update firmware or software at the IoT device in response to a determination that an update for the IoT device is available;
calibrate one or more sensors of the IoT device; and
configure the IoT device to transmit IoT data to another network device in response to the calibration of the one or more sensors.

17. The non-transitory, computer-readable storage medium of claim 16, wherein the instructions further comprise instructions to:
configure the IoT device to measure one or more samples;
configure the IoT device to transmit test IoT data to the network device;
establish a connection between the computational device and the network device, wherein the test IoT data includes one or more values in correspondence to one or more measurements, performed by the IoT device, of the one or more samples; and present the test IoT data to a user of the computational device based on the connection.

18. The non-transitory, computer-readable storage medium of claim 16, wherein the instructions further comprise instructions to:

present location points on the map, wherein each location point indicates where each IoT device is to be installed at the location; and update a presentment of each location point on the map to indicate that each IoT device is successfully installed at each location point in correspondence to a progress of a user successfully installing each IoT device at each location point.

19. The non-transitory, computer-readable storage medium of claim 16, wherein the instructions further comprise instructions to:

pair with a communication interface of the IoT device, wherein the IoT device is turned off and a connection is established between the computational device and the IoT device; and read via the connection at least a portion of the IoT management information from a memory included in the communication interface of the IoT device in response to the establishment of the connection with the IoT device, and wherein the instructions to store the IoT management information at the IoT device comprise further instructions to:

write via the connection all of the IoT management information to the memory, wherein the IoT management information includes a user-assigned identifier of the IoT device and the IoT device information includes an equipment identifier, a make and a model of the IoT device, security credentials, and a number and type of the one or more sensors included in the IoT device.

20. The non-transitory, computer-readable storage medium of claim 16, wherein the instructions further comprise instructions to:

receive a user input indicating a calibration error pertaining to one of the one or more sensors included in the IoT device;

select a troubleshoot task in response to the user input; and guide the user to perform the troubleshoot task in response to the selection of the troubleshoot task.

* * * * *